United States Patent
Aoki

(10) Patent No.: US 10,432,801 B2
(45) Date of Patent: Oct. 1, 2019

(54) DEVICE MANAGEMENT SYSTEM, DEVICE MANAGEMENT METHOD, AND RECORDING MEDIUM

(71) Applicant: Satoshi Aoki, Kanagawa (JP)

(72) Inventor: Satoshi Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/113,273

(22) Filed: Aug. 27, 2018

(65) Prior Publication Data

US 2019/0082058 A1 Mar. 14, 2019

(30) Foreign Application Priority Data

Sep. 12, 2017 (JP) ................. 2017-174443

(51) Int. Cl.
*H04N 1/00* (2006.01)

(52) U.S. Cl.
CPC ..... *H04N 1/00037* (2013.01); *H04N 1/00042* (2013.01); *H04N 1/00053* (2013.01); *H04N 1/00079* (2013.01)

(58) Field of Classification Search
CPC .......... H04N 1/00037; H04N 1/00042; H04N 1/00053; H04N 1/00079
USPC ....................................... 358/1.15
See application file for complete search history.

(56) References Cited

U.S. PATENT DOCUMENTS

| | | | | |
|---|---|---|---|---|
| 6,298,449 B1 * | 10/2001 | Carter | ...................... | G06F 1/30 713/340 |
| 8,601,157 B2 * | 12/2013 | Hozumi | .............. | H04L 67/1008 709/203 |
| 2004/0133674 A1 | 7/2004 | Sasaki | | |
| 2015/0242177 A1 * | 8/2015 | Nakahara | .............. | G06F 3/1287 358/1.15 |
| 2015/0277820 A1 * | 10/2015 | Anezaki | ................ | G06F 3/1236 358/1.15 |
| 2016/0014088 A1 * | 1/2016 | Maekawa | ............. | H04L 67/141 726/12 |
| 2016/0224291 A1 * | 8/2016 | Ishino | ................... | G06F 3/1238 |

FOREIGN PATENT DOCUMENTS

| | | |
|---|---|---|
| JP | 2004-163891 | 6/2004 |
| JP | 2016-152461 | 8/2016 |

* cited by examiner

*Primary Examiner* — Allen H Nguyen
(74) *Attorney, Agent, or Firm* — Oblon, McClelland, Maier & Neustadt, L.L.P.

(57) ABSTRACT

A device management system and a device management method are provided, each of which: receives status information indicating a status of a relay device from the relay device, the relay device being connected with one or more devices in a local network via a firewall; based on a determination that the received status information satisfies a predetermined condition, obtains instruction information associated with the predetermined condition, the instruction information indicating a predetermined process to be executed by the relay device; and transmits the obtained instruction information to the relay device to cause the relay device to execute the predetermined process.

19 Claims, 28 Drawing Sheets

FIG. 6

| ITEM | CONDITION | CONDITION ID |
|---|---|---|
| CPU | >80% | A0001 |
| MEMORY | Out of Memory | A0002 |
| | >900 MB | A0003 |
| STORAGE | >1.8 GB | A0004 |
| POWER SUPPLY | Over Current | A0005 |
| | ≤10% | A0006 |
| ... | ... | ... |

FIG. 7

| CONDITION ID | MEASURE INFORMATION |
|---|---|
| A0001 | FORCED-TERMINATION OF CURRENTLY ACTIVE SOFTWARE |
| A0002 | REBOOT PROCESS |
| A0003 | REBOOT PROCESS |
| A0004 | DELETION OF EXISTING FILE |
| A0005 | DISCHARGE PROCESS |
| A0006 | SWITCH TO SLEEP MODE |
| ... | ... |

| ITEM | Value |
|---|---|
| CPU | 40% |
| MEMORY | 950 MB/1 GB |
| STORAGE | 1.4 GB/2 GB |
| POWER SUPPLY | 80% |
| NUMBER OF THREADS | 1000 |
| FILE DESCRIPTOR | 3 |
| SOCKET COMMUNICATION (NUMBER OF CONNECTED CLIENTS) | 5 |
| ... | ... |

FIG. 15

| | 130 |
|---|---|
| COMMAND ID | B0001 |
| SUCCESS OR FAILURE OF MEASURE | SUCCESS |
| STATUS | RESTORED |
| CAUSE | OUT OF MEMORY |
| ... | ... |

FIG. 17

| ITEM | | CONDITION | MEASURE INFORMATION |
|---|---|---|---|
| CPU | | >80% | FORCED-TERMINATION OF CURRENTLY ACTIVE SOFTWARE |
| MEMORY | | Out of Memory | REBOOT PROCESS |
| | | >900 MB | REBOOT PROCESS |
| STORAGE | | >1.8 GB | DELETION OF EXISTING FILE |
| POWER SUPPLY | | Over Current | DISCHARGE PROCESS |
| | | ≤10% | SWITCH TO SLEEP MODE |
| ... | | ... | ... |

| ITEM | CONDITION | CONDITION ID |
|---|---|---|
| CPU | >80% | AA0001 |
| MEMORY | Out of Memory | AA0002 |
| MEMORY | >900 MB | AA0003 |
| STORAGE | >1.8 GB | AA0004 |
| POWER SUPPLY | Over Current | AA0005 |
| POWER SUPPLY | ≤10% | AA0006 |
| LAMP | PRESET TEMPERATURE OR ABOVE | AA0007 |
| ... | ... | ... |

| CONDITION ID | MEASURE INFORMATION |
|---|---|
| AA0001 | FORCED-TERMINATION OF CURRENTLY ACTIVE SOFTWARE |
| AA0002 | REBOOT PROCESS |
| AA0003 | REBOOT PROCESS |
| AA0004 | DELETION OF EXISTING FILE |
| AA0005 | DISCHARGE PROCESS |
| AA0006 | SWITCH TO SLEEP MODE |
| AA0007 | POWER SUPPLY OFF |
| ... | ... |

FIG. 30

| LOG ID | STATUS INFORMATION |
|---|---|
| C0001 | CPU; 40%<br>MEMORY; 950MB/1GB<br>STORAGE; 1.4GB/2GB<br>POWER SUPPLY; 80%<br>⋮ |
| C0002 | ... |
| ... | ... |

580 (table), 590 (first data row)

DEVICE MANAGEMENT SYSTEM, DEVICE MANAGEMENT METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2017-174443, filed on Sep. 12, 2017, in the Japan Patent Office, the entire disclosure of which is hereby incorporated by reference herein.

BACKGROUND

Technical Field

The present invention relates to a device management system, a device management method, and a recording medium.

Description of the Related Art

A remote management system that remotely manages information device provided in a local network from outside the local network is known. In the remote management system, for example, a relay device capable of acquiring device information from the information device is provided in the local network. In addition, a management server located outside the local network communicates with the relay device via a firewall, thereby achieving remote management of the information device.

In such a system, the relay device detects a failure (abnormality) of the connected information device and transmits a device status of the information device to the management server. Thus, the management server can execute a process to resolve the failure (abnormality) of the information device.

For example, there is a technique such that, when a specific management server is not in operation, a router transmits a request for starting the specific management server to other management server, and the other management server starts the specific management server, thereby transmitting information on a failure toward a cloud side network from the router.

SUMMARY

Example embodiments of the present invention include a device management system and a device management method, each of which: receives status information indicating a status of a relay device from the relay device, the relay device being connected with one or more devices in a local network via a firewall; based on a determination that the received status information satisfies a predetermined condition, obtains instruction information associated with the predetermined condition, the instruction information indicating a predetermined process to be executed by the relay device; and transmits the obtained instruction information to the relay device to cause the relay device to execute the predetermined process.

Example embodiments of the present invention include a non-transitory recording medium storing a control program for controlling the device management system to perform a device management method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating one example of an alert policy according to the first embodiment;

FIG. 7 is a diagram illustrating one example of a measure information management table according to the first embodiment;

FIG. 15 is a diagram illustrating one example of content of feedback of the preventive measure in the relay device according to the first embodiment;

FIG. 17 is a diagram illustrating one example of a measure information management table according to variation 1 of the first embodiment;

FIG. 26 is a diagram illustrating one example of a second alert policy according to the third embodiment;

FIG. 27 is a diagram illustrating one example of a second measure information management table according to the third embodiment;

FIG. 30 is a diagram illustrating one example of status information according to the fourth embodiment;

Figure 1:
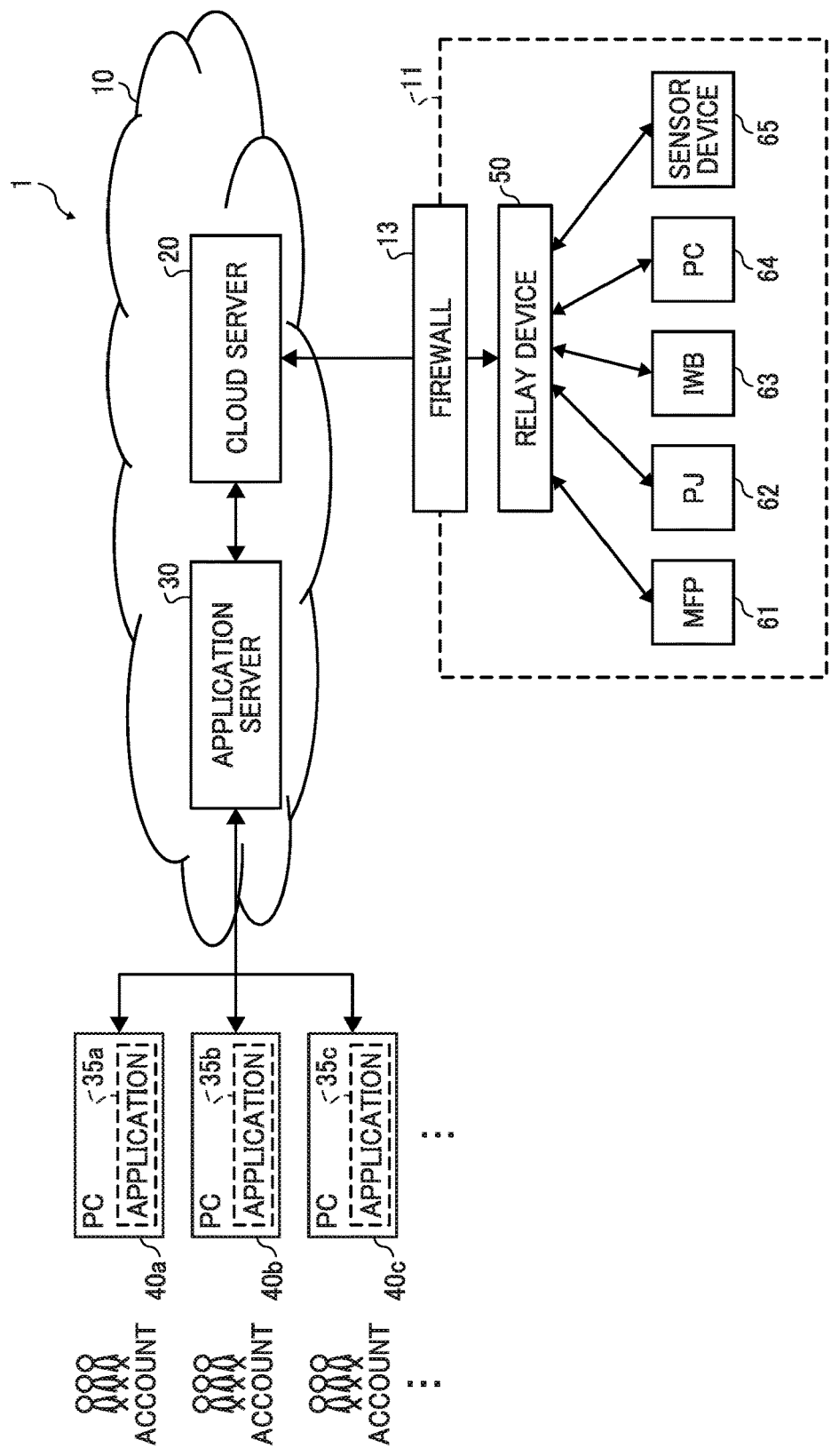
FIG. 1 is a diagram illustrating one example of a system configuration of a remote management system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present invention will be described below with reference to the drawings. In the description of the drawings, same elements are denoted by same reference numerals, and redundant description is omitted.

First Embodiment

System Configuration

FIG. 1 illustrates one example of a system configuration of a remote management system according to a first embodiment. The remote management system 1 illustrated in FIG. 1 detects a sign of failure (abnormality) on the basis of resource information acquired from a relay device 50 by a device management system 10 and performs a preventive measure, such that the remote management system 1 can be continuously and normally operated. The remote management system 1 includes the device management system 10, a local network 11 and a firewall 13. The local network 11 is connected to the device management system 10 via the Internet. The local network 11 and the device management system 10 are connected with each other with the firewall 13 as an interface.

The local network 11 is a communication network configured in a network environment such as an office, a conference room, a warehouse, a factory and a specific production line. The local network 11 is, for example, an in-house LAN (Local Area Network) configured not via the Internet. The local network 11 includes the relay device 50, an MFP (Multi-Function Peripheral: multifunction machine) 61, a PJ (Projector) 62, an IWB (Interactive White Board: a white board having an electronic blackboard function capable of mutual communication) 63, a PC (Personal Computer) 64, and a sensor device 65 (e.g., an electronic balance, a barometer, an accelerometer, an ammeter, a thermometer, a photometer, a human sensor, a camera, a luminometer, which can communicate with the outside). The MFP 61, the PJ 62, the IWB 63, the PC 64, and the sensor device 65 are managed devices that are objects of remote management in the device management system 10. The device 60 used in the following description is a generic name of these managed devices.

The firewall 13 has a function for passing only specific packets from the device management system 10 (the Internet) into the local network 11. This allows the firewall 13 to block an unintended or unauthorized access to the local network 11. In addition, the firewall 13 has a function for transferring a packet from the relay device 50 to the device management system 10.

The device management system 10 is a system for managing the relay device 50 and the device 60 that are located in the local network 11. The device management system 10 includes a cloud server 20 and an application server 30. The cloud server 20 includes a plurality of server computers and is connected to the relay device 50 via the firewall 13. The cloud server 20 remotely manages the device 60 in the local network 11 via the relay device 50. As one example of management, the cloud server 20 can acquire information on a state such as a toner remaining amount and a number of printed sheets from the MFP 61. In addition, the cloud server 20 can make an instruction to execute printing of document data accumulated in the MFP 61. Moreover, the cloud server 20 can control ON/OFF of a power supply to the PJ 62, the IWB 63, and the PC 64. Furthermore, the cloud server 20 can acquire information acquired by the sensor device 65. The cloud server 20 is one example of a first management device.

The application server 30 is a server device that provides application software (hereinafter referred to as application) for achieving a desired solution with the use of an accessing function of the cloud server 20. The solution includes, for example, a log collection service related to the device 60, a counter collection service related to the device 60, a maintenance service of the device 60, and the like. The application server 30 provides an application 35 to a PC 40a, a PC 40b, and a PC 40c (hereinafter referred to as "PC 40" when they are not distinguished), respectively. The application server 30 is one example of a second management device.

The PC 40 is a PC connected to the device management system 10. The application 35a is operated in the PC 40a, the application 40b is operated in the PC 40b, and the application 35c is operated in the PC 40c (hereinafter referred to as application 35 unless the applications 35a-c are distinguished from one another). An account illustrated in FIG. 1 is for grouping a plurality of users (administrators) using the application 35. The application 35 can provide a different solution for each application. For example, the application 35 can set a solution to be provided according to a use environment of the local network 11 and a type of the device 60. The application server 30 manages a plurality of applications 35 to be provided to each PC 40.

The relay device 50 is a device that mediates communication between the cloud server 20 and the device 60 in the local network 11. The relay device 50 can communicate with the device 60 and the firewall 13 via a wired or wireless LAN, or the like. The relay device 50 accesses the device 60 upon receipt of an instruction from the cloud server 20, transmits to the cloud server 20 an alert notification from the device 60, and performs an information acquisition notification and alive monitoring of the device 60 (e.g., whether the device 60 is communicable). The relay device 50 may be a box type (box-shaped) communication device functioning as a stand-alone or may be built in the information device such as the MFP 61.

In addition, the relay device 50 can communicate with the cloud server 20 on the Internet via the firewall 13. That is, the relay device 50 is located in the local network 11 with the firewall as the interface. The cloud server 20 constituting the device management system 10 is located outside the local network 11 with the firewall as the interface.

The device 60 (the MFP 61, the PJ 62, the IWB 63, the PC 64, and the sensor device 65) is located in the local network 11, specifically within the firewall 13 being the interface thereof. The device 60 is a managed object subjected to maintenance, counter meter reading and the like performed by the device management system 10. In addition, the device 60 may be obtained by equipping, a terminal having no function such as a human sensor, with a network function.

While FIG. 1 illustrates an example in which the device management system 10 remotely manages a plurality of pieces of the device 60 located in one local network 11, the device management system 10 may be configured to remotely manage the device 60 located in each of a plurality of local networks 11. In addition, while FIG. 1 illustrates the example in which one relay device is located in one local network 11, two or more relay devices 50 may be located in one local network. In this case, functions carried by the relay devices 50 may be divided for each relay device 50.

Figure 2:
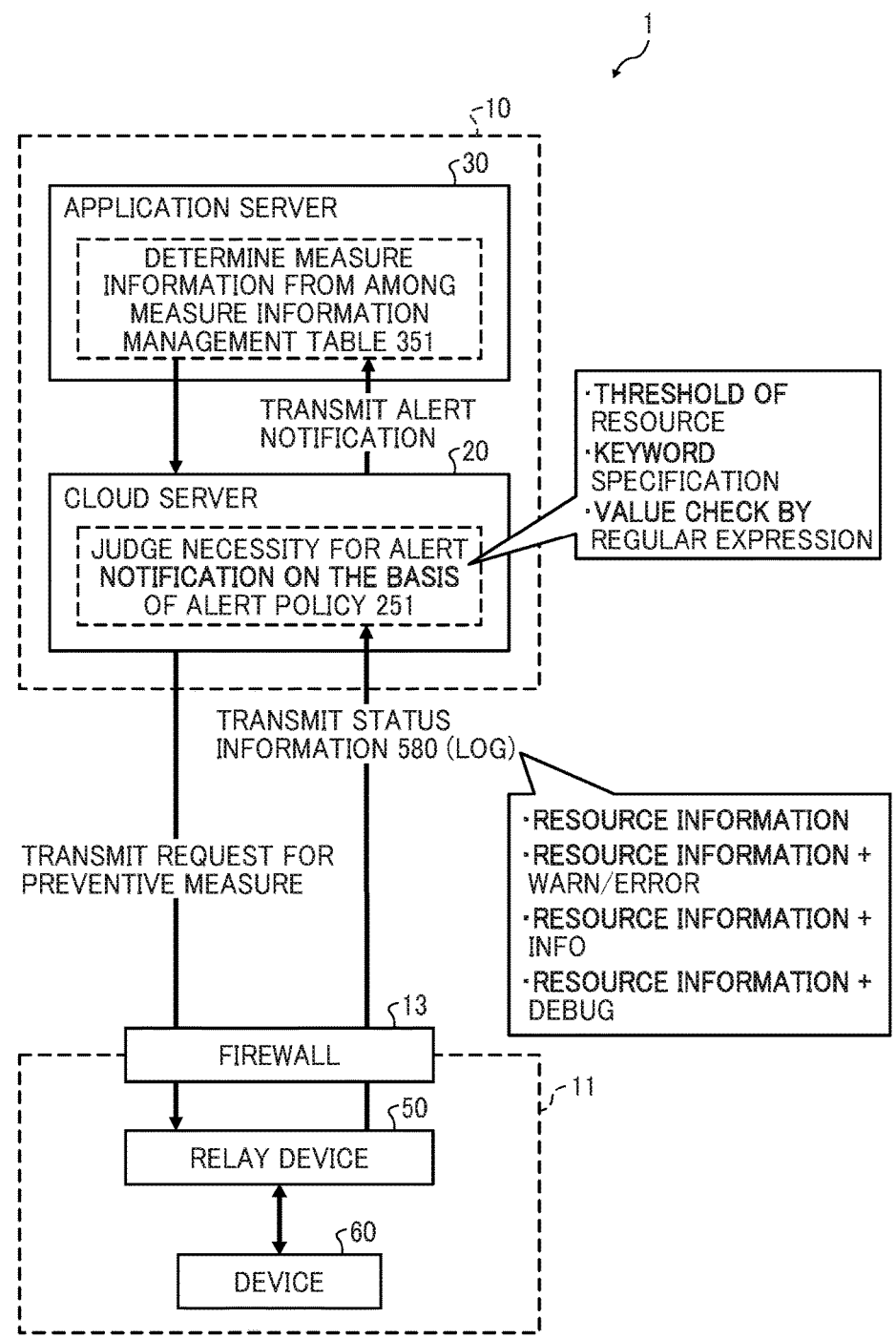
FIG. 2 is a diagram illustrating schematic one example of the remote management system according to the first embodiment.

FIG. 2 is a diagram illustrating schematic one example of the remote management system according to the first embodiment. The remote management system 1 illustrated in FIG. 2 illustrates that the device management system 10 detects a sign of failure (abnormality) of the relay device 50 located in the local network 11 to perform a preventive measure so as to prevent the relay device 50 from operating abnormally. FIG. 2 briefly outlines the remote management system according to the first embodiment, and details of functions and the like achieved by the remote management system 1 will be described with the use of after-mentioned drawings and the like.

The relay device 50 transmits to the cloud server 20 status information 580 indicating a status of the relay device 50 on the basis of a preset schedule. The status information 580 includes, for example, log information on a computer resource and an operating status of the relay device 50. For example, when detecting occurrence of the failure of the relay device 50 or the device 60, the relay device 50 may transmit the status information 580 including information indicating the detected failure state (WARN, ERROR, INFO, DEBUG, etc.). A time (schedule) at which the relay device 50 transmits the status information 580 and content of the status information 580 to be transmitted are set by the application server 30.

When receiving the status information 580 from the relay device 50, the cloud server 20 constituting the device management system 10 judges necessity for an alert notification for the application server 30 on the basis on a preset alert policy 251. The alert notification is made to the application server 30 when the status of the relay device 50 (e.g., a sign of failure (abnormality) of the relay device 50) is detected by the cloud server 20.

The alert policy 251 includes a predetermined condition for judging the necessity for the alert notification. The condition included in the alert policy 251 includes a condition that a threshold of a computer resource usage (operation amount) of the relay device 50 is exceeded. The condition included in the alert policy 251 includes a condition that the status information 580 includes a predetermined character string indicating a resource status of the relay device 50. Detailed content of the status information 580 and the alert policy 251 is described later. When the received status information 580 fulfills the predetermined condition included in the alert policy 251, the cloud server 20 transmits the alert notification to the application server 30.

When receiving the alert notification from the cloud server 20, the application server 30 constituting the device management system 10 determines measure information for the relay device 50 on the basis of a measure information management table 351. The measure information instructs execution of a predetermined process associated (correlated) with a predetermined condition for judging necessity for an alert notification. The measure information is one example of instruction information instructing the relay device 50 to execute a predetermined process. For example, the measurement information includes information instructing content of the predetermined process to be executed by the relay device 50 in order to improve operation of the relay device 50 to reduce or prevent further detection of a sign of failure (abnormality) of the relay device 50.

For example, when the sign of failure of the relay device 50 indicates that the relay device 50 is out of memory, the measure information is set with a reboot process of the relay device 50. In addition, the measure information is set with a process such as: deletion of file when the relay device 50 is in disk-full; reset of peripheral device when an I/O error occurs; and update of firmware or the like when there is a bug in software. Details of the measure information management table 351 and the measure information are described later. The application server 30 transmits a request for a preventive measure based on the determined measure information to the relay device 50 via the cloud server 20.

When receiving the request for the preventive measure transmitted by the application server 30 via the cloud server 20, the relay device 50 executes the requested preventive measure. Thus, on the basis of the request from the application server 30, the relay device 50 can devise a countermeasure before a failure (abnormality) occurs in a resource status or the like.

Therefore, in the remote management system according to the first embodiment, the device management system 10 periodically collects log information of the relay device 50 and preliminarily detects a sign of failure (abnormality) of the relay device 50. Then, the device management system 10 requests the relay device 50 of a preventive measure for preventing further detection of the detected sign of failure (abnormality). In the remote management system 1, since the device management system 10 acquires log information of the device 60 via the relay device 50, when a failure occurs in the relay device 50, management of the device 60 may not be possible. However, the remote management system 1 can execute a preventive measure before a failure (abnormality) occurs in the relay device 50. Thus, the system can be continuously and normally operated.

Hardware Configuration

Next, each device of the remote management system 1 according to the first embodiment will be described. Each device constituting the remote management system 1, that is, the application server 30, the cloud server 20, and the relay device 50 has a configuration of a computer 1000, which is a general computer. Here, an example of a hardware configuration of the computer 1000 will be described.

Figure 3:
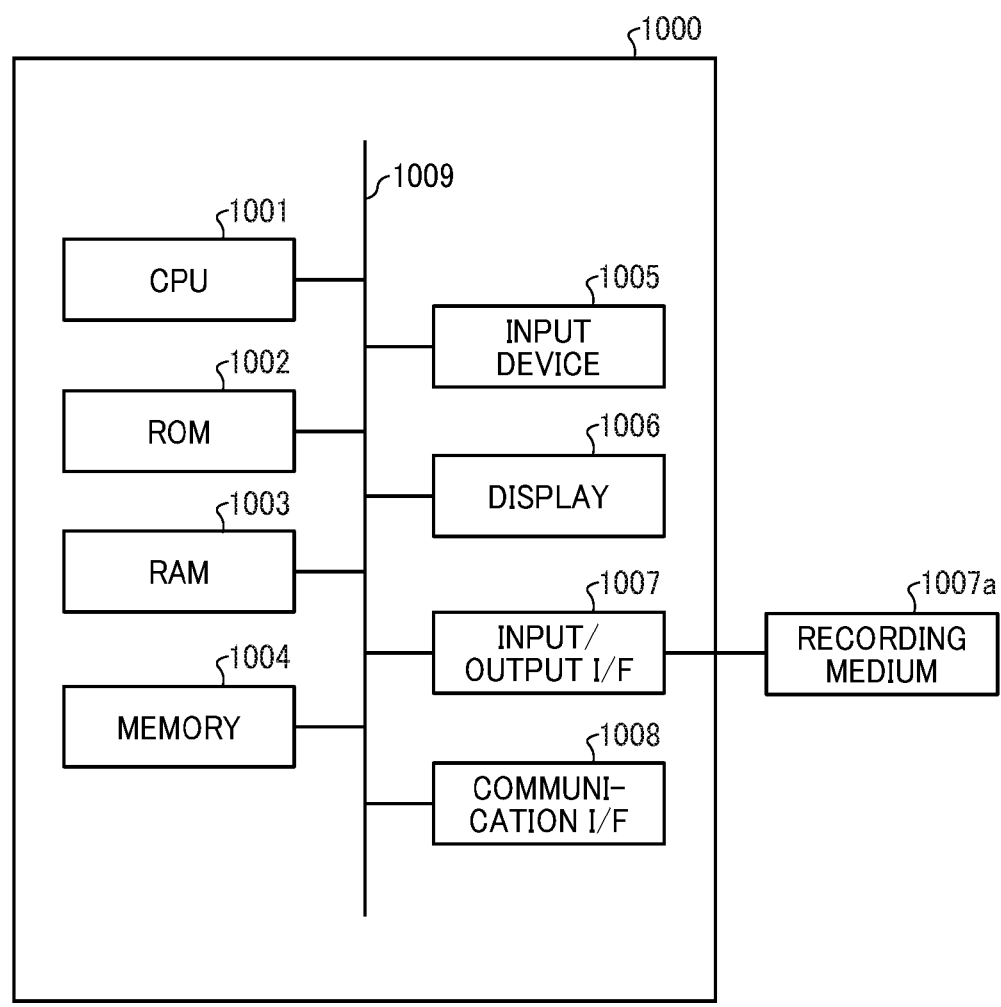
FIG. 3 is a diagram illustrating one example of a hardware configuration of a computer according to the first embodiment.

FIG. 3 is a diagram illustrating one example of a hardware configuration of a computer 1000 according to the first embodiment. A hardware configuration of the computer 1000 illustrated in FIG. 3 may have a same configuration in each embodiment, and components may be added or deleted as necessary. The computer 1000 includes a CPU (Central Processing Unit) 1001, a ROM (Read Only Memory) 1002, a RAM (Random Access Memory) 1003, a memory 1004, an input device 1005, a display 1006, an input/output interface (I/F) 1007, a communication I/F 1008, a bus 1009, and the like.

The CPU 1001 is a computing device that reads out, programs and data stored in the ROM 1002, the memory 1004 and the like, onto the RAM 1003, and executes a process so as to implement each function of the computer 1000. The cloud server 20 and the application server 30, which operate in cooperation to implement the device management system 10, performs device management according to a control program, which is executed, for example, by the CPU 1001.

The ROM 1002 is a non-volatile memory that keeps storing programs and data even when a power supply is turned off. The ROM 1002 includes, for example, a flash ROM or the like. The ROM 1002 has an installed SDK (Software Development Kit) compatible with various uses. The function of the computer 1000, network connection, and the like can be achieved with the use of the SDK application.

The RAM 1003 is a volatile memory used as a work area or the like of the CPU 1001. The memory 1004 is, for example, a memory with large capacity, such as an HDD (Hard Disk Drive) and an SSD (Solid status Drive). The memory 1004 stores, for example, an OS (Operation System), an application program, various types of data, and the like.

The input device 1005 accepts an input for operating the computer 1000. The input device 1005 is, for example, an input device such as a keyboard, a mouse, and a touch panel. The display 1006 displays a process result or the like of the computer 1000. The display 1006 is, for example, a display device such as an LCD (Liquid Crystal Display). The input device 1005 or the display 1006 may be provided outside the computer 1000. For example, if the computer 1000 operates as the server, the input device 1005 and the display 1006 may not be provided. The input device 1005 and the display 1006 may be, for example, an integrated display input device such as a touch panel display.

The input/output interface (I/F) 1007 is an interface circuit for connecting a peripheral device to the computer 1000. The peripheral device includes, for example, a recording medium 1007a such as a USB (universal serial bus) memory, a memory card, and an optical disk, and various types of electronic device, and the like.

The communication I/F 1008 connects the computer 1000 to a network, and exchanges data with other computers, electronic device, and the like. The communication I/F 1008 is, for example, a communication interface circuit such as a wired or wireless LAN. In addition, the communication I/F 1008 may be provided with a communication interface such as 3G (3rd Generation), LTE (Long Term Evolution), 4G (4th Generation), 5G (5th Generation), Zigbee (Registered Trademark), EnOcean, BLE (Bluetooth (Registered Trademark) Low Energy), NFC (Near Field Communication), millimeter wave wireless communication, infrared communication, QR code (Registered Trademark), visible light, environmental sound and ultrasonic wave.

The bus 1009 is commonly connected to each of the above components and transmits an address signal, a data signal, various types of control signals, and the like. The CPU 1001, the ROM 1002, the RAM 1003, the memory 1004, the input device 1005, the display 1006, the input/output interface (I/F) 1007, and the communication I/F 1008 are mutually connected to one another via the bus 1009.

In a hardware configuration of each device according to the first embodiment, components may be added or deleted as necessary. In addition, the hardware configuration of each device illustrated in FIG. 3 may have a same configuration in each embodiment.

For example, in this disclosure, a control section of the device 60 is substantially the same in hardware configuration as that of the computer 1000 described above. However, depending on a specific function of each device 60, a dedicated device may further be included in the device 60. For example, in case of the MFP 61, an image forming device such as a scanner and a printer are further included.

Function Configuration

Figure 4:
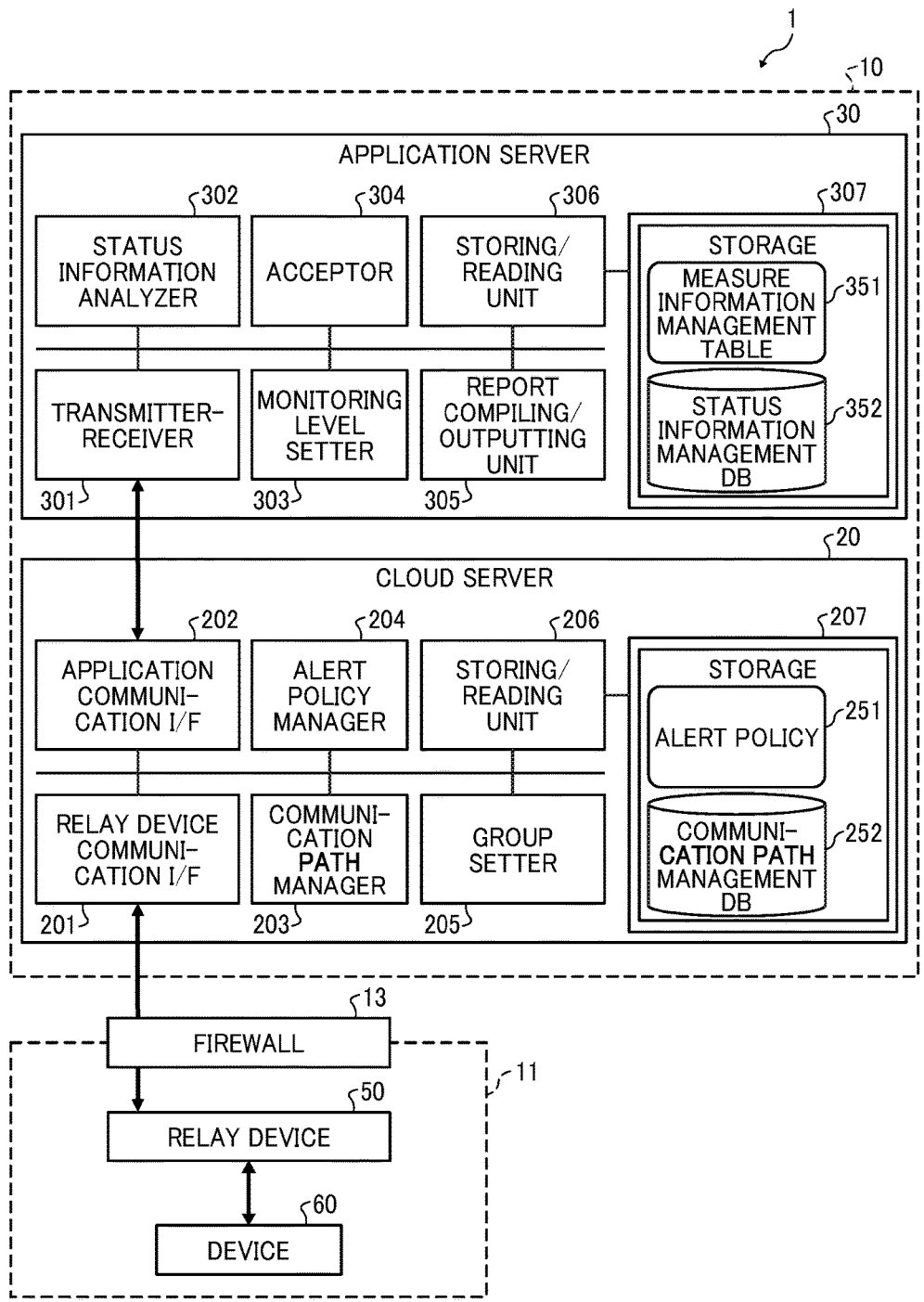
FIG. 4 is a diagram illustrating one example of a function configuration of a cloud server and an application server according to the first embodiment.

Next, a function configuration of the remote management system according to the first embodiment will be described. FIG. 4 is a diagram illustrating one example of a function configuration of a cloud server and an application server according to the first embodiment. Functions achieved by the cloud server 20 illustrated in FIG. 4 include a relay device communication I/F 201, an application communication I/F 202, a communication path manager 203, an alert policy manager 204, a group setter 205, a storing/reading unit 206, and a storage 207.

The relay device communication I/F 201 exchanges data with the relay device 50. The relay device communication I/F 201 controls communication with the relay device 50 located inside the local network 11 via a firewall. The relay device communication I/F 201 receives, for example, the status information 580 indicating a status of the relay device 50 from the relay device 50.

In addition, the relay device communication I/F 201 transfers to the relay device 50, for example, a command (request for a preventive measure) transmitted from the application server 30. Specifically, the relay device communication I/F 201 transmits, the request for the preventive measure for the relay device 50 or the device 60 transmitted from the application server 30, to the relay device 50. The request for a preventive measure includes measure information that is determined by an after-mentioned status information analyzer 302. The measure information instructs execution of a predetermined process associated with a predetermined condition for judging necessity for an alert notification by the after-mentioned alert policy manager 204. The measure information is one example of instruction information instructing the relay device 50 to execute the predetermined process.

The relay device communication I/F 201 receives from the relay device 50 an execution result of the command (request for the preventive measure) transmitted from the application server 30, for example. The relay device communication I/F 201 is implemented by, for example, a program or the like executed by the communication I/F 1008 and the CPU 1001 that are illustrated in FIG. 3. The relay device communication I/F 201 is one example of a receiving unit and a transmitting unit.

Here, since the firewall 13 is normally installed between the local network 11 and the Internet environment, the application server 30 (or the PC 40 executing the application 35 provided from the application server 30) cannot be directly connected to the relay device 50. Therefore, communication between the application server 30 and the relay device 50 is performed via the cloud server 20.

Specifically, the relay device 50 polls from the relay device 50 to the cloud server 20 and acquires an instruction from the application server 30 via the cloud server 20 as a response to the polling. Alternatively, a communication session (WebSocket, etc.) is maintained in such a manner that the relay device 50 can communicate with the cloud server 20 at all times, and the application server 30 (or the application 35) transmits data to the relay device 50 via the cloud server 20. In this embodiment, either method may be used.

The application communication I/F 202 exchanges data with the application server 30. The application communication I/F 202 uses HTTPS protocol (HyperText Transfer Protocol Secure) to communicate with the application server 30. The communication method is not limited to this, and a protocol such as FTP (File Transfer Protocol), HTTP (HyperText Transfer Protocol) and SMTP (Simple Mail Transfer Protocol) may be used.

The application communication I/F 202 transmits an alert notification to the application server 30, for example. The application communication I/F 202 receives, for example, a command (request for a preventive measure) transmitted from the application server 30. Specifically, the application communication I/F 202 receives the request for the preventive measure for the relay device 50 from the application server 30. The application communication I/F 202 is implemented by, for example, a program or the like executed by the communication I/F 1008 and the CPU 1001 that are illustrated in FIG. 3.

The communication path manager 203 is a function unit that manages a communication path between the application 35 provided by the application server 30 and the relay device 50 or the device 60. The communication path manager 203 manages, for example, the communication path between the application 35 provided by the application server 30 and the relay device 50 or the device 60 with the use of a communication path management DB 252. Then, when an instruction is issued from the application 35 (or the application server 30), the communication path manager 203 determines, to which relay device 50 routing should be performed, with the use of information managed by the communication path management DB 252.

In addition, the communication path manager 203 determines, to which application 35 information notified from the relay device 50 should be transferred, with the use of the information managed by the communication path management DB 252. The communication path manager 203 is implemented by, for example, a program or the like executed by the CPU 1001 illustrated in FIG. 3.

The alert policy manager 204 is a function unit that manages the alert policy 251 for detecting a status of the relay device 50. The alert policy manager 204 judges necessity for an alert notification for the application server 30 on the basis of the alert policy 251 stored in the storage 207. The alert policy 251 is, for example, for detecting a sign of failure (abnormality) of the relay device 50. Details of the alert policy 251 are described later. The alert policy manager 204 is implemented by, for example, a program or the like executed by the CPU 1001 illustrated in FIG. 3. The alert policy manager 204 is one example of a notifying unit.

The group setter 205 is a function unit that performs grouping setting for collectively transmitting alert notifications to a plurality of applications 35 provided by the application server 30. The group setter 205 groups the applications 35 that need an alert notification. On the other hand, the group setter 205 removes an application 35 that does not need the alert notification from the group to prevent the cloud server 20 from transmitting the alert notification. The group setter 205 is implemented by, for example, a program or the like executed by the CPU 1001 illustrated in FIG. 3.

The storing/reading unit 206 is a function unit that stores various types of data in the storage 207 and reads out various types of data from the storage 207. The storing/reading unit 206 and the storage 207 are implemented by, for example, a program or the like executed by the ROM 1002, the memory 1004, and the CPU 1001 that are illustrated in FIG. 3. The storage 207 associates the communication path management DB 252 managed by the communication path manager 203. In addition, the storage 207 stores the alert policy 251.

Here, the alert policy 251 stored in the storage 207 will be described. FIG. 6 is a diagram illustrating one example of an alert policy according to the first embodiment. The alert policy 251 illustrated in FIG. 6 is for detecting a sign of failure (abnormality) of the relay device 50. The alert policy 251 includes information corresponding to an "item" related to a computer resource, a "condition" for judging necessity for an alert notification and a "condition ID" for identifying the condition. For the alert policy 251, the "condition" is set for each "item", and the "condition ID" is associated with each "condition". The alert policy 251 sets each operating status and usage (usage rate) as the "condition" for the "item" such as CPU, memory, and storage so as to detect the sign of failure (abnormality) of the relay device 50.

The "item" indicates information indicating a general-purpose computer resource. The "item" illustrated in FIG. 6 includes, for example, a CPU, a memory, a storage, a power supply and the like. In addition, the "item" may include a number of threads, a file descriptor, a number of connected clients of Socket communication, and the like.

The "condition" is for judging necessity for an alert notification. For example, the "condition" is for detecting a sign of failure (abnormality) of the relay device 50. The "condition" includes a condition that a threshold of a computer resource usage (operation amount) of the relay device 50 is exceeded. The "condition" illustrated in FIG. 6 includes, for example, a condition that the usage rate exceeds 80% for the "item" CPU. The "condition" also includes a condition that the status information 580 includes a predetermined character string indicating a resource status of the relay device 50. The "condition" illustrated in FIG. 6 includes, for example, a condition that "Out of Memory" is included for the "item" memory.

The alert policy manager 204 extracts, information (e.g., keyword, character string, etc.) corresponding to the "item" included in the alert policy 251, from among the status information 580 received from the relay device 50. If the extracted content fulfills a "condition", the alert policy manager 204 judges so as to transmit the alert notification to the application server 30. The content of the "item" and the "condition" included in the alert policy 251 illustrated in FIG. 6 is one example and can be set and changed arbitrarily by an administrator or the like of the device management system 10.

Next, a function configuration of the application server 30 will be described. Functions achieved by the application server 30 illustrated in FIG. 4 include a transmitter-receiver 301, the status information analyzer 302, a monitoring level setter 303, an acceptor 304, a report compiling/outputting unit 305, a storing/reading unit 306, and a storage 307.

The transmitter-receiver 301 is a function unit that exchanges data with the cloud server 20. The transmitter-receiver 301 uses HTTPS protocol to communicate with the cloud server 20. The communication method is not limited to this, and a protocol such as FTP, HTTP and SMTP may be used. The transmitter-receiver 301 receives, for example, the alert notification transmitted from the cloud server 20. In addition, the transmitter-receiver 301 transmits to the cloud server 20 a request for a preventive measure for the relay device 50. The request for the preventive measure includes measure information determined by the after-mentioned status information analyzer 302. The transmitter-receiver 301 is implemented by, for example, a program or the like executed by the communication I/F 1008 and the CPU 1001 that are illustrated in FIG. 3.

The status information analyzer 302 is a function unit that determines content of the preventive measure for the relay device 50 on the basis of the status information 580 of the relay device 50. For example, when receiving an alert notification from the cloud server 20, the status information analyzer 302 uses the measure information management table 351 stored in the storage 307 to determine measure information for the relay device 50.

The measure information instructs execution of a predetermined process associated (related) with a predetermined condition for judging necessity for an alert notification. For example, the measurement information includes information instructing content of the predetermined process to be executed by the relay device 50 in order to prevent further detection of a sign of failure (abnormality) of the relay device 50. The measure information is one example of instruction information instructing the relay device 50 to execute a predetermined process. The process content included in the measure information is, for example, a reboot process, a file deletion process, and the like. The status information analyzer 302 is implemented by, for example, a program or the like executed by the CPU 1001 illustrated in FIG. 3.

Here, the measure information management table 351 will be described. FIG. 7 is a diagram illustrating one example of a measure information management table according to the first embodiment. The measure information management table 351 illustrated in FIG. 7 manages measure information for preventing further detection of a sign of failure (abnormality) of the relay device 50. The measure information management table 351 associates "measure information" instructing the relay device 50 to prevent occurrence of the sign of failure (abnormality) with the "condition ID" to manage.

The "condition ID" corresponds to the "condition ID" included in the alert policy 251 illustrated in FIG. 6. The "measure information" is instruction information instructing process content to be executed by the relay device 50 in order to prevent further detection of a sign of failure (abnormality) of the relay device 50. The "measure information" is set with process content such as: deletion of file when the relay device 50 is in disk-full; reset of peripheral device when an I/O error occurs; and update of firmware, or the like when there is a bug in software.

The status information analyzer 302 determines, the "measure information" associated with the "condition ID" that is same as the "condition ID" included in the alert notification received from the cloud server 20, as process content for instructing the relay device 50. When the "condition ID" included in the alert notification is "A0003", the measure information management table 351 illustrated in FIG. 7 determines "reboot process" as the "measure information". The measure information management table 351 may be provided for each application 35 provided by the application server 30. The content of the "measure information" included in the measure information management table 351 may be arbitrarily set and changed by a user of the application 35 provided by the application server 30.

The monitoring level setter 303 is a function unit that sets a monitoring level for the relay device 50 or the device 60. The monitoring level setter 303 sets for each relay device 50 under monitoring a time (e.g., schedule, interval period, etc.) at which the status information 580 of the relay device 50 and device information of the device 60 are acquired.

In addition, the monitoring level setter 303 sets content of log information (the status information 580 or the device information) acquired from the relay device 50. For example, the monitoring level setter 303 sets, the relay device 50 to transmit information corresponding to a specific "item" (resource item) included in the alert policy 251 illustrated in FIG. 6, as the status information 580. The monitoring level setter 303 is implemented by, for example, a program or the like executed by the CPU 1001 illustrated in FIG. 3. The status information analyzer 302 acquires, on the basis of the monitoring level set by the monitoring level setter 303, log information (the status information 580 or the device information) from the relay device 50, detects a sign of failure (abnormality), and performs a preventive measure.

The monitoring level setter 303 may set, for each application 35 provided by the application server 30, the monitoring level for the relay device 50 or the device 60 under management. In addition, when a failure (abnormality) occurs in the relay device 50 or the device 60, the monitoring level setter 303 may set an operation log (ERROR, WARN, INFO, DEBUG, etc.) so as to be transmitted from the relay device 50 or the device 60.

The acceptor 304 is a function unit that accepts a command to the relay device 50 and the device 60 under management. For example, the acceptor 304 causes, the PC 40 executing the application 35 provided by the application server 30, to display a status and information of the relay device 50 and the device 60 that are to be managed. In addition, the acceptor 304 causes, the PC 40 executing the application 35 provided by the application server 30, to display a screen provided with a user I/F accepting a command such as information acquisition and control for the relay device 50 and the device 60 that are to be managed. The acceptor 304 is implemented by, for example, a program or the like executed by the display 1006 and the CPU 1001 that are illustrated in FIG. 3.

The report compiling/outputting unit 305 is a function unit that compiles and outputs data in a user's desired format. For example, the report compiling/outputting unit 305 aggregates counter information of the managed device 60, collects the counter information in a CSV (Comma Separated Value) format, and generates and outputs a report on a monthly basis. The report compiling/outputting unit 305 is implemented by, for example, a program or the like executed by the CPU 1001 illustrated in FIG. 3.

The storing/reading unit 306 is a function unit that stores various types of data in the storage 307 and reads out the various types of data from the storage 307. The storing/reading unit 306 and the storage 307 are implemented by, for example, a program or the like executed in the ROM 1002, the memory 1004, and the CPU 1001 that are illustrated in FIG. 3. The storage 307 stores the measure information management table 351 illustrated in FIG. 7. The storage 307 builds a status information management DB 352. The status information management DB 352 manages the status information 580 indicating a resource status of the relay device 50 transmitted from the relay device 50.

Figures 8A, 8B:
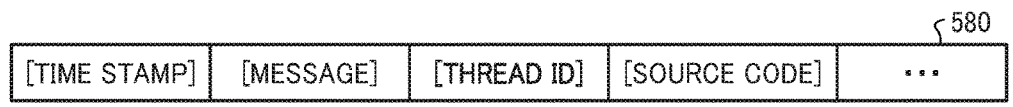
FIGS. 8A and 8B are diagrams illustrating one example of status information according to the first embodiment.

Here, the status information 580 managed in the status information management DB 352 will be described. FIGS. 8A and 8B are diagrams illustrating one example of status information according to the first embodiment. FIG. 8A illustrates an outline of the content of the status information 580 transmitted from the relay device 50. The status information 580 includes information such as a "time stamp", a "message", a "thread ID", and a "source code".

The "time stamp" includes information indicating a time when the relay device 50 transmits the status information 580. The "message" includes information on a resource of the relay device 50. FIG. 8B illustrates content included in the "message". The "message" indicates, for example, a usage rate of a CPU, a usage of a memory, a usage of a storage, remaining power of a power supply (battery), a number of thread IDs, a number of file descriptors, a number of connected clients of Socket communication of the relay device 50, and the like. The item included in the message is not limited to this. Referring back to FIG. 8A, the "thread ID" is for identifying a predetermined thread when a plurality of threads are executed in one process executed by the relay device. The "message" may include information or the like on a number of lines of the "source code" containing a character string and a code that should be confirmed.

Figure 5:
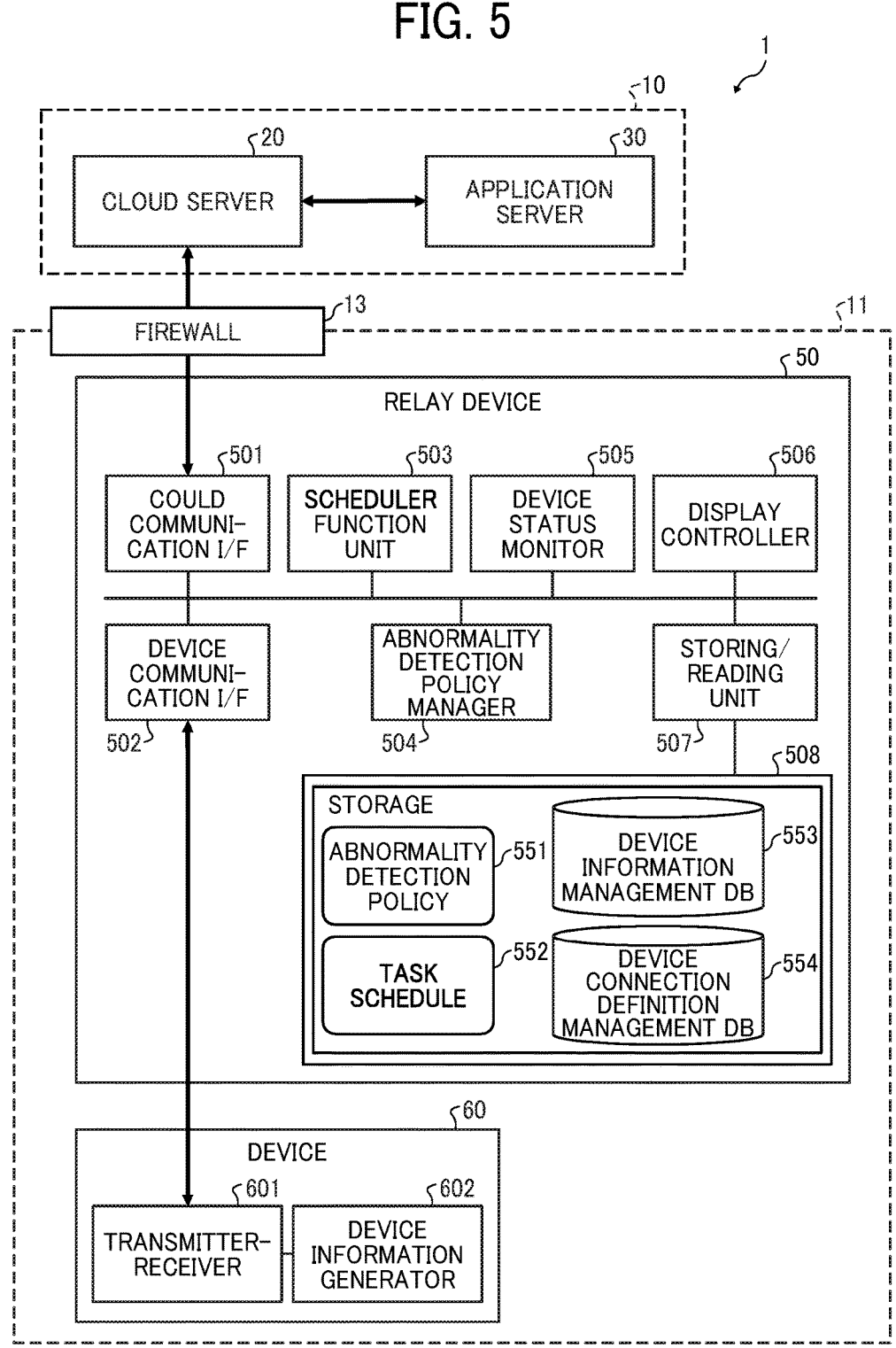
FIG. 5 is a diagram illustrating one example of a function configuration of a relay device and device according to the first embodiment.

FIG. 5 is a diagram illustrating one example of a function configuration of a relay device and device according to the first embodiment. Functions achieved by the relay device 50 illustrated in FIG. 5 include a cloud communication I/F 501, a device communication I/F 502, a scheduler function unit 503, an abnormality detection policy manager 504, a device status monitor 505, a display controller 506, a storing/reading unit 507, and a storage 508.

The cloud communication I/F 501 is a function unit that exchanges data with the cloud server 20. The cloud communication I/F 501 transmits, for example, log information of the relay device 50 or the device 60 (e.g., the status information 580 of the relay device 50 illustrated in FIGS. 8A and 8B, the device information of the device 60, etc.) to the cloud server 20. In addition, the cloud communication I/F 501 receives from the cloud server 20, for example, a command (a request for a preventive measure) issued by the application server 30 (or the application 35 provided by the application server 30). The cloud communication I/F 501 transmits to the cloud server 20 an execution result of a process for the command (the request for the preventive measure) issued by the application server 30 (or the application 35 provided by the application server 30). The cloud communication I/F 501 is implemented by, for example, a program or the like executed in the communication I/F 1008 and the CPU 1001 that are illustrated in FIG. 3.

The device communication I/F 502 is a function unit that exchanges data with the device 60. The device communication I/F 502 uses HTTP protocol or SNMP protocol (Simple Network Management Protocol) to communicate with the device 60. A communication method is not limited to this, and a protocol such as HTTPS or LPD (Line Printer Daemon) may be used. The device communication I/F 502 receives, for example, a text message or binary data which is a device alert from the device 60. In addition, the device communication I/F 502 interprets content of the command issued by the application server 30 (or the application 35 provided by the application server 30) and transmits a request to the device 60. The device communication I/F 502 is implemented by, for example, a program or the like executed in the communication I/F 1008 and the CPU 1001 that are illustrated in FIG. 3.

The scheduler function unit 503 is a function unit that acquires information from the managed device 60 on the basis of an internal timer of the relay device 50 and a preset schedule (task schedule 552) and notifies the acquired information to the cloud server 20. In addition, the scheduler function unit 503 performs a periodic operation such as confirming whether the device 60 is capable of network communication (alive monitoring) or the like. The scheduler function unit 503 is implemented by, for example, a program or the like executed in the CPU 1001 illustrated in FIG. 3.

The abnormality detection policy manager 504 is a function unit that manages an abnormality detection policy 551 for detecting a sign of failure (abnormality) of the device 60. The abnormality detection policy manager 504 detects a sign of failure (abnormality) of the device 60 on the basis of the abnormality detection policy 551 stored in the storage 508. The abnormality detection policy manager 504 is implemented by, for example, a program or the like executed in the CPU 1001 illustrated in FIG. 3.

The device status monitor 505 is a function unit that monitors a resource status of the relay device 50. The device status monitor 505 detects a sign of failure (abnormality) such as out of memory, out of storage, a write error, and the like. The device status monitor 505 generates the status information 580 including a monitoring result of the resource status on the basis of the task schedule 552 stored in the storage 508. The device status monitor 505 is implemented by, for example, a program or the like executed by the CPU 1001 illustrated in FIG. 3.

The display controller 506 is a function unit that performs a display. The display is for carrying out network setting to communicate with the cloud server 20 and the device 60, an activation procedure or connection confirmation, or the like to start communication with the cloud server 20. The display controller 506 is implemented by, for example, a program or the like executed by the display 1006 and the CPU 1001 that are illustrated in FIG. 3.

The storing/reading unit 507 is a function unit that stores various types of data in the storage 508 and reads out the various types of data from the storage 508. The storing/reading unit 507 and the storage 508 are implemented by, for example, a program or the like executed in the ROM 1002, the memory 1004 and the CPU 1001 that are illustrated in FIG. 3. The storage 508 stores the abnormality detection policy 551 and the task schedule 552.

The abnormality detection policy 551 is, for example, a policy indicating a condition for detecting a sign of failure (abnormality) of the device 60. Content of the abnormality detection policy 551 may be the same as that of the alert policy 251 illustrated in FIG. 6, and information particular to the device 60 may be added according to a type of device 60. The task schedule 552 holds a schedule for transmitting a log acquisition request to the device 60 and a schedule for transmitting a log (the status information 580 or the device information) to the cloud server 20. The task schedule 552 is set by the application server 30 that manages the relay device 50 (or the application 35 provided by the application server 30).

In addition, the storage 508 builds a device information management DB 553 and an device connection definition management DB 554. The device information management DB 553 manages device information received from the device 60. The device information includes information indicating a resource status, information on an operating status of the device 60, and the like. The device connection definition management DB 554 manages communication parameters for executing addition, deletion, search, device information acquisition, and communication confirmation of the device 60. HTTP communication parameters include, for example, a resource URI (Uniform Resource Identifier), a method, a header, a query, and a body. In addition, communication parameters of SNMP include, for example, a command type (Get/GetBulk), a version, a community name, and an OID (object identifier).

Figure 9:
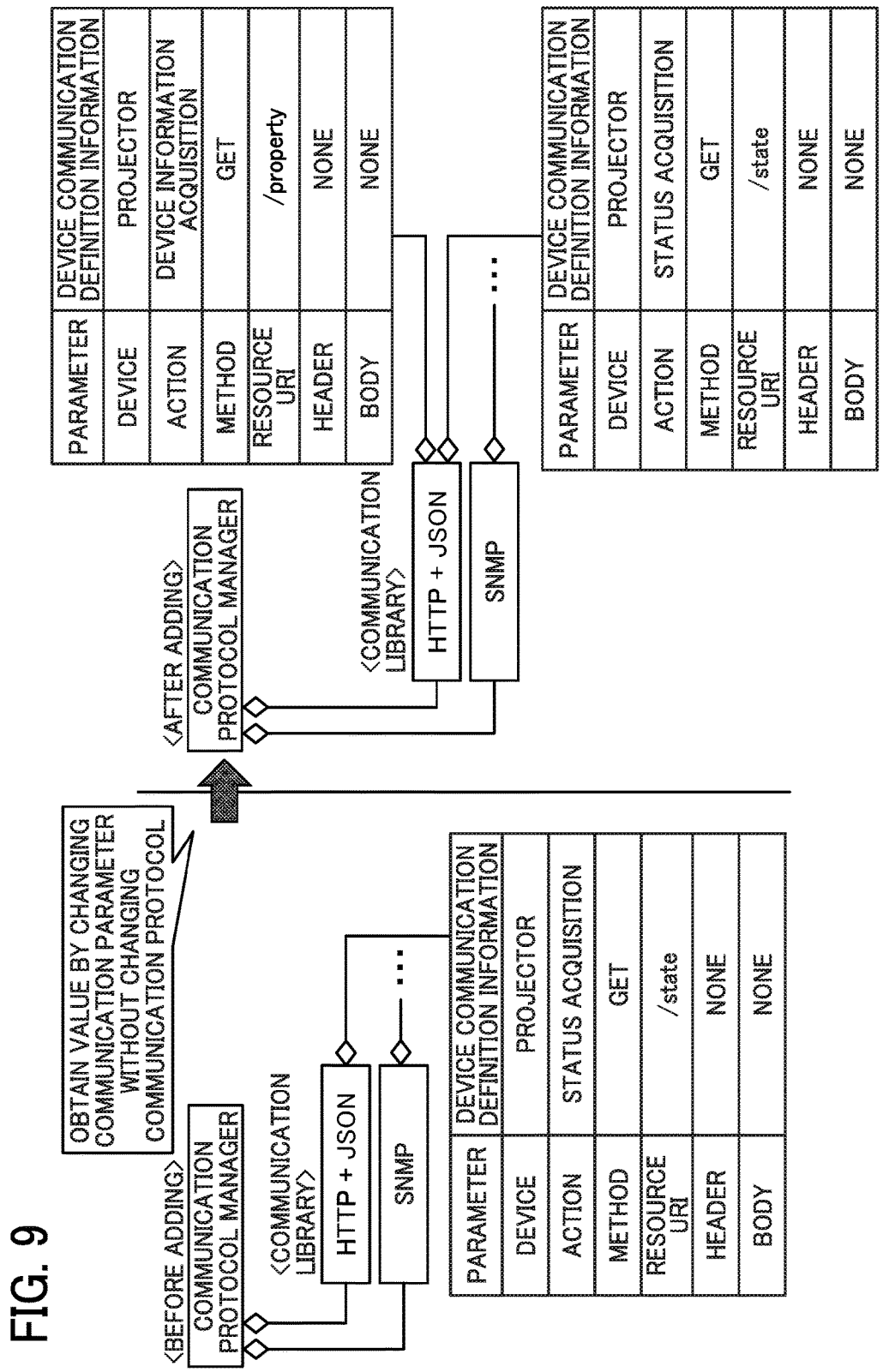
FIG. 9 is a diagram illustrating one example of a device connection definition according to the first embodiment.

Here, a device connection definition will be described with the use of FIG. 9. FIG. 9 is a diagram illustrating one example of a device connection definition according to the first embodiment. FIG. 9 illustrates an example of a case where a value is obtained by changing a communication parameter without changing a communication protocol of the device connection definition. In the device connection definition before adding illustrated in FIG. 9, a communication protocol that can be used for communication with device 60 is HTTP (a body part is JSON (Java (Registered Trademark) Script Object Notation)) and SNMP. When HTTP communication is performed, parameters such as a method, a resource URI, a header, and a body must be specified.

The device connection definition before adding illustrated in FIG. 9 is an example of status acquisition (GET/state) from a projector. A device communication definition information corresponding to a parameter "device" is "projector". Similarly, "action" is "status acquisition", "method" is "GET", "resource URI" is "/state", "header" is "none", "body" is "none". The communication protocol manager is a function included in the device connection definition management DB 554, and a communication library is a group of a plurality of usable communication protocols.

In the device connection definition after adding illustrated in FIG. 9, a communication parameter is added to the HTTP+JSON in the communication library. In the added communication parameter, the device communication definition information corresponding to the parameter "action" is "device information acquisition". In addition, the device communication definition information corresponding to a parameter "resource URI" is "/property". With the addition of the communication parameter, the relay device 50 can perform "confidential information acquisition" for "/property" with respect to the device "projector". The addition of parameter illustrated in FIG. 9 may be based on an instruction of the application server 30. By adding or changing a parameter as described above, the device connection definition can be easily extended without updating firmware of the relay device 50.

Next, a function configuration of the device 60 will be described. Function achieved by device 60 illustrated in FIG. 5 include a transmitter-receiver 601 and an device information generator 602. While FIG. 5 illustrates a case where one piece of device 60 is located in the local network 11, a plurality of pieces of device 60 may be provided in the local network 11.

The transmitter-receiver 601 is a function unit that exchanges data with the relay device 50. The transmitter-receiver 601 uses HTTP protocol or SNMP protocol to communicate with the relay device 50. A communication method is not limited to this, and a protocol such as HTTPS or LPD may be used.

The transmitter-receiver 601 transmits to the relay device 50, for example, device information such as a text message or binary data that is an device alert. In addition, the transmitter-receiver 601 receives from the relay device 50, for example, a command (a request for a preventive measure) issued by the application server 30 (or the application 35 provided by the application server 30). The transmitter-receiver 601 transmits to the relay device 50, for example, an execution result of a process for the command (the request for the preventive measure) issued by the application server 30 (or the application 35 provided by the application server 30). The transmitter-receiver 601 is implemented by, for example, a program or the like executed in the communication I/F 1008 and the CPU 1001 that are illustrated in FIG. 3.

The device information generator 602 is a function unit that generates device information of the device 60. The device information is log information including information indicating a resource status and information on an operating status of the device 60. In response to a request from the relay device 50, the device information generator 602 generates device information to be transmitted to the relay device 50. The device information generator 602 is implemented by, for example, a program or the like executed in CPU 1001 illustrated in FIG. 3.

Device Management Method

Figure 10:
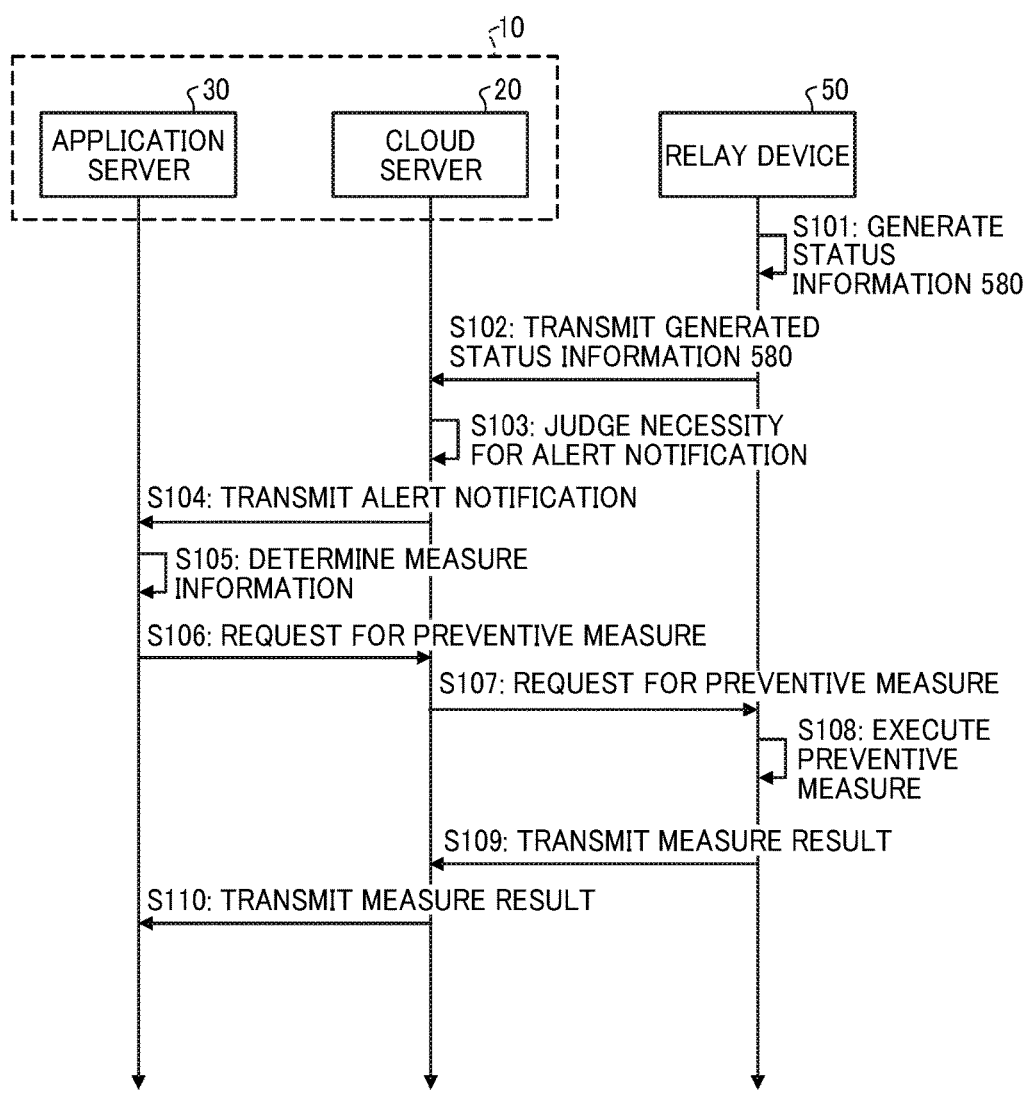
FIG. 10 is a sequence diagram illustrating one example of a device management method in the remote management system according to the first embodiment.

Next, a device management method in the remote management system 1 will be described. FIG. 10 is a sequence diagram illustrating one example of a device management method in the remote management system according to the first embodiment. FIG. 10 illustrates a process in which the device management system 10 detects a sign of failure (abnormality) of the relay device 50. The relay device 50 preliminarily stores in the storage 508 the task schedule 552 that is set by the application server 30 and that indicates a time for transmitting log information (the status information 580).

In step S101, the relay device 50 generates the status information 580 indicating a resource status of the relay device 50. In step S102, the relay device 50 transmits the generated status information 580 to the cloud server 20. Specifically, the relay device 50 repeats a generation process of the status information 580 in step S101 and a transmitting process of the status information 580 in step S102 on the basis of the task schedule 552 stored in the storage 508. As illustrated in FIG. 8B, the status information 580 includes information indicating the resource status of the relay device 50, such as a status of a CPU, a memory, a storage, a file descriptor, and a network I/F.

Here, content of the status information 580 transmitted by the relay device 50 can be set and changed by the monitoring level setter 303 of the application server 30. When a size of the status information 580 is large, it takes time to complete transmission, and the cloud server 20 cannot grasp a status of the relay device 50 at short intervals. In addition, when the size of the status information 580 is large, the cloud server 20 may exceed a communication size limit, for example, on a mobile line or the like. Therefore, it is preferable to narrow down the content to be included in the status information 580 to a necessary log.

Figure 11:
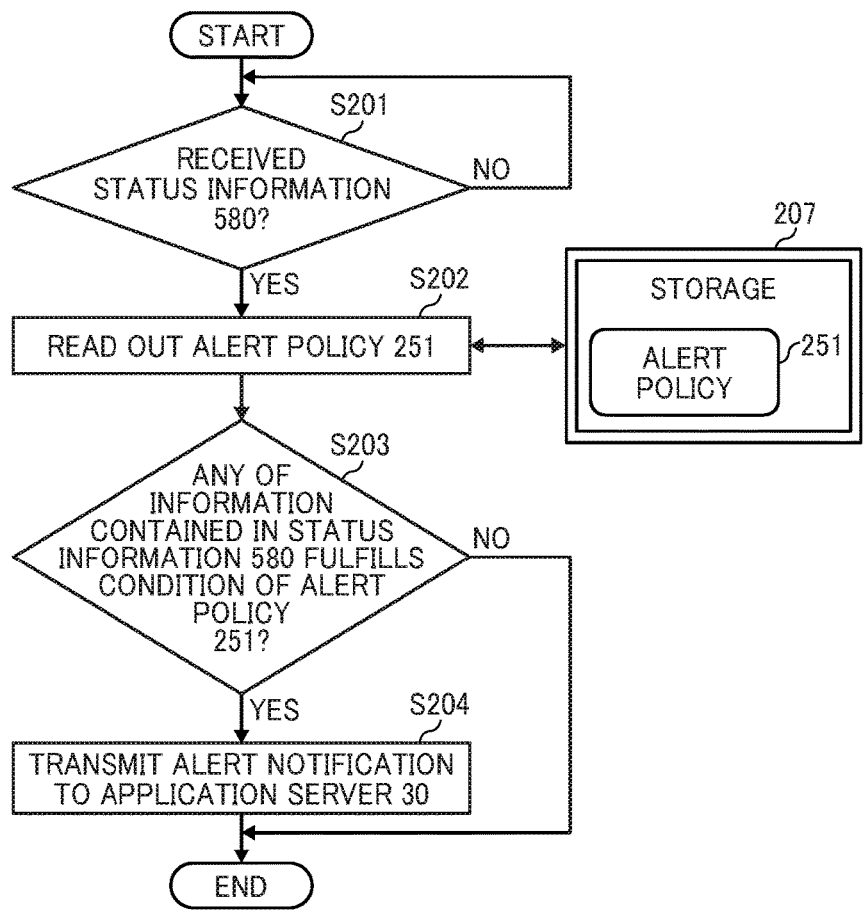
FIG. 11 is a flowchart illustrating one example of an alert notification process in the cloud server according to the first embodiment.

In step S103, when receiving the status information 580 from the relay device 50, the cloud server 20 judges necessity for an alert notification for the application server 30 on the basis of the alert policy 251. Here, the judgement of necessity for an alert notification in the cloud server 20 will be described. FIG. 11 is a flowchart illustrating one example of an alert notification process in the cloud server according to the first embodiment. FIG. 11 illustrates an example in which the alert policy 251 illustrated in FIG. 6 is preliminarily stored in the storage 207. In addition, the status information 580 transmitted from the relay device 50 has the same content as that illustrated in FIGS. 8A and 8B.

In step S201, when receiving the status information 580 from the relay device 50, the relay device communication I/F 201 of the cloud server 20 proceeds to a process of step S201 (one example of a receiving step). When not receiving the status information 580 from the relay device 50, the relay device communication I/F 201 of the cloud server 20 repeats the process of step S201.

In step S202, the alert policy manager 204 of the cloud server 20 reads out the alert policy 251 stored in the storage 207. Specifically, the alert policy manager 204 outputs a readout request of the alert policy 251 to the storing/reading unit 206. Upon detecting the output readout request, the storing/reading unit 206 reads out the alert policy 251 stored in the storage 207. Then, the storing/reading unit 206 outputs the read out alert policy 251 to the alert policy manager 204.

In step S203, when determining that if any of the received information contained in the status information 580 fulfills a condition of alert policy 251, the alert policy manager 204 of the cloud server 20 proceeds to a process in to step S204. The alert policy manager 204 extracts, for example, information (e.g., keywords, character string, etc.) corresponding to the "item" included in the alert policy 251, from among the status information 580 transmitted from the relay device 50. Then, if the extracted content fulfills a "condition" included in the alert policy 251, the alert policy manager 204 judges so as to transmit the alert notification to the application server 30.

In step S204, the application communication I/F 202 of the cloud server 20 transmits the alert notification to the application server 30. While it is assumed that the alert notification is transmitted with the use of, for example, HTTPS protocol, the communication protocol is not limited to this.

Figure 12:
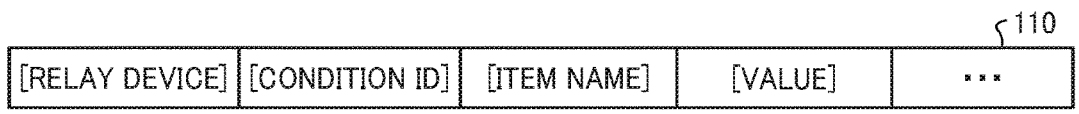
FIG. 12 is a diagram illustrating one example of alert content transmitted by the cloud server according to the first embodiment.

Here, content of the alert notification transmitted from the cloud server 20 will be described. FIG. 12 is a diagram illustrating one example of alert content transmitted by the cloud server according to the first embodiment. The alert notification 110 illustrated in FIG. 12 includes information such as a "relay device to be an alert object", a "condition ID", an "item name", a "Value", and the like. For the "condition ID", a "condition ID" associated with a "condition" that is included in the alert policy 251 and judged to be fulfilled is described. For the "item name" and the "Value", an item that is judged to fulfill the condition by the alert policy manager 204 and a value that is included in the status information 580 and corresponds to the item are described.

For example, in a case of the status information 580 illustrated in FIGS. 8A and 8B, capacity of a memory fulfills a condition among the conditions included in the alert policy 251 illustrated in FIG. 6. Thus, the cloud server 20 transmits the alert notification 110 including information of "memory" in the item and "950 MB" in the Value. Content of the alert notification illustrated in FIG. 12 is one example and may include a plurality of "items".

In step S203, if none of the received information contained in the status information 580 fulfills a condition of alert policy 251, the alert policy manager 204 of the cloud server 20 terminates the process. In this case, since the log (the status information 580) transmitted from the relay device 50 does not include information indicating a sign of failure (abnormality) of the relay device 50, the cloud server 20 determines that the relay device 50 is normally operated and does not make an alert notification to the application server 30.

Referring back to FIG. 10, the description of the device management method in the remote management system according to the first embodiment will be continued. In step S104, as illustrated in FIG. 11, the cloud server 20 transmits an alert notification to the application server 30. In step S105, when receiving the alert notification from the cloud server 20, the application server 30 determines measure information for the relay device 50.

Figure 13:
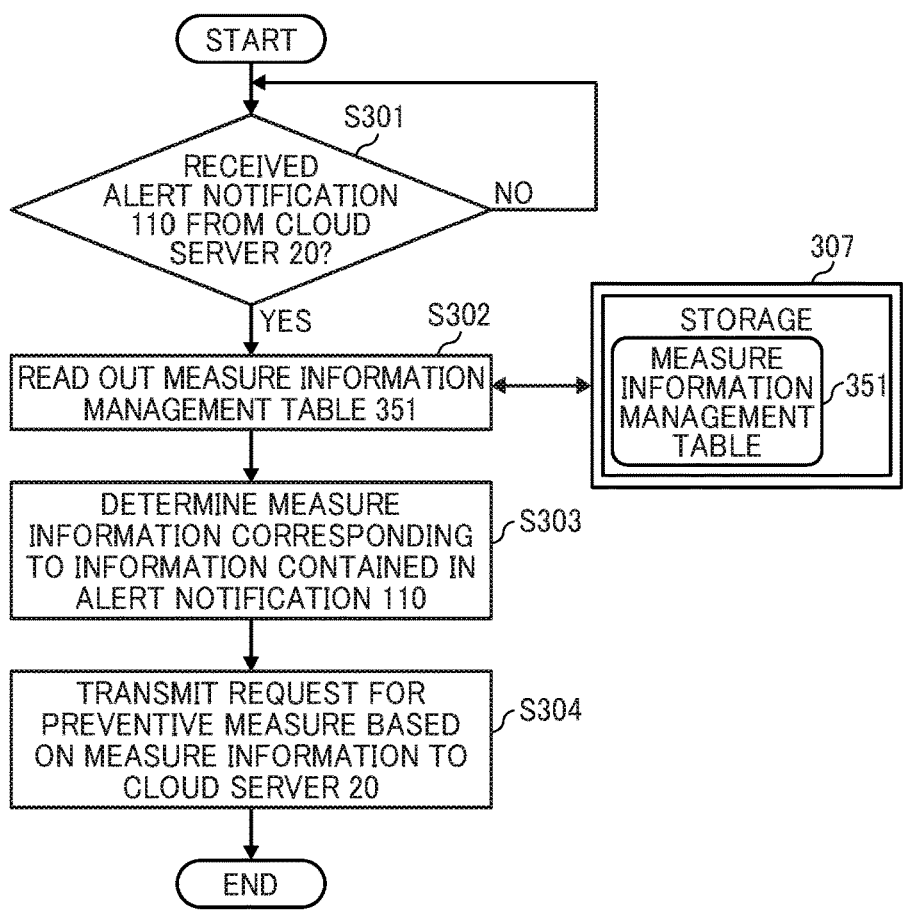
FIG. 13 is a flowchart illustrating one example of a process for determining measure information in the application server according to the first embodiment.

Here, a process for determining the measure information in the application server 30 will be described. FIG. 13 is a flowchart illustrating one example of a process for determining measure information in the application server according to the first embodiment. FIG. 13 illustrates an example in which the measurement information management table 351 illustrated in FIG. 7 is preliminarily stored in the storage 307.

In step S301, when receiving the alert notification 110 from the cloud server 20, the transmitter-receiver 301 of the application server 30 proceeds to a process of step S302. When not receiving the alert notification 110 from the cloud server 20, the transmitter-receiver 301 of the application server 30 repeats the process of step S301.

In step S302, the status information analyzer 302 of the application server 30 reads out the measure information management table 351 stored in the storage 307. More specifically, the status information analyzer 302 outputs a readout request of the measure information management table 351 to the storing/reading unit 306. Upon detecting the output readout request, the storing/reading unit 306 reads out the measure information management table 351 stored in the storage 307. Then, the storing/reading unit 306 outputs the read out measure information management table 351 to the status information analyzer 302.

In step S303, the status information analyzer 302 of the application server 30 determines measure information corresponding to the received information included in the alert notification 110 (one example of a determining step). Specifically, the status information analyzer 302 determines, in the measure information management table 351, measure information related with a condition ID that is same as a condition ID included in the alert notification 110. The condition ID included in the alert notification illustrated in FIG. 12 is "A0003", for example. Thus, the status information analyzer 302 determines, in the measurement information management table 351 illustrated in FIG. 7, "reboot process" associated with the "A0003" as the measure information.

Figure 14:
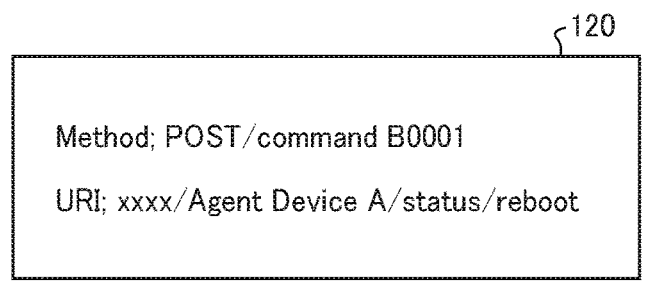
FIG. 14 is a diagram illustrating one example of content of a request for a preventive measure according to the first embodiment.

In step S304, the transmitter-receiver 301 of the application server 30 transmits to the cloud server 20 a request for a preventive measure based on the determined measure information. FIG. 14 is a diagram illustrating one example of content of a request for a preventive measure according to the first embodiment. The request for the preventive measure 120 illustrated in FIG. 14 is for instructing the relay device 50 to prevent further detection of a failure (abnormality). The relay device 50 is judged to have a sign of failure (abnormality) on the basis of content of the status information 580. The request for a preventive measure 120 includes, as a message, information such as a "command ID", a "relay device of a request destination", and "measure information" determined by the status information analyzer 302. The request for the preventive measure 120 illustrated in FIG. 14 includes, for example, a command ID "B0001", a request destination "relay device A", and measure information "reboot". The request for the preventive measure 120 is supposed to be transmitted with the use of, for example, the HTTPS protocol, but the communication protocol is not limited to this.

Referring back to FIG. 10, the description of the device management method in the remote management system according to the first embodiment will be continued. In step S106, the application server 30 transmits a request for a preventive measure to the cloud server 20 as illustrated in FIG. 13. In step S107, the cloud server 20 transfers to the relay device 50 the request for the preventive measure transmitted from the application server 30 (one example of a transmitting step).

In step S108, when receiving the request for the preventive measure from the cloud server 20, the relay device 50 executes the requested preventive measure. For example, when receiving the request for the preventive measure 120 illustrated in FIG. 14 from the cloud server 20, the relay device 50 executes the "reboot process" instructed as the measure information. In step S109, when the preventive measure is terminated, the relay device 50 transmits a measure result notification to the cloud server 20 as feedback to the request for the preventive measure. In step S110, the cloud server 20 transfers to the application server 30 the measurement result notification transmitted from the relay device 50.

Here, content of the measure result notification transmitted by the relay device 50 will be described. FIG. 15 is a diagram illustrating one example of content of feedback of the preventive measure in the relay device according to the first embodiment. A measurement result notification 130 illustrated in FIG. 15 includes information such as a "command ID", "success or failure of measure", a "status of a relay device", and a "cause of failure". The measurement result notification 130 illustrated in FIG. 15 corresponds to, for example, the command ID "B0001" included in the request for the preventive measure 120 illustrated in FIG. 14. The measurement result notification 130 illustrated in FIG. 15 indicates that the requested preventive measure succeeded and the status of the relay device 50 was restored. The measure result notification 130 illustrated in FIG. 15 also notifies that the cause of failure (abnormality) was out of memory. By acquiring the measure result notification 130 from the relay device 50, the application server 30 can know a measure result for a command (a request for a preventive measure) issued by itself.

According to content of the measure result notification 130, if further detection of a sign of failure (abnormality) has not been prevented, the application server 30 may transmit a different request for a preventive measure to the relay device 50. In addition, if the measure result notification 130 cannot be received for a certain period after transmitting the request for the preventive measure, the application server 30 may again transmit a similar request for a preventive measure to the relay device 50. The application server 30 may update content of the measure information management table 351 on the basis of acquired content of the measure result notification 130.

As described above, in the remote management system according to the first embodiment, the cloud server 20 constituting the device management system 10 acquires the status information 580 indicating a status of the relay device 50 from the relay device 50. The application server 30 constituting the device management system 10 determines the instruction information instructing the relay device 50 to execute a predetermined process on the basis of the status information 580 acquired by the cloud server 20. Then, the cloud server 20 transmits a request for a preventive measure to the relay device 50 on the basis of the instruction information determined by the application server 30. Therefore, the remote management system according to the first embodiment detects a sign of failure (abnormality) and performs a preventive measure before occurrence of the failure (abnormality) due to the relay device 50. Thus, the system can be continued and normally operated. In a prior art, corresponding measures have been taken after a failure occurred in information device connected to a relay device which is a router and in the relay device itself. Thus, there has been a problem that an operating rate of a system is decreased. In the remote management system according to the first embodiment described above, since a sign of failure (abnormality) is detected and a preventive measure is performed, the system can be continuously and normally operated.

Variation 1 of the First Embodiment

Next, variation 1 of the first embodiment will be described. A remote management system according to variation 1 of the first embodiment performs a process for determining measure information for improving a sign of failure (abnormality) of the relay device 50 illustrated in FIG. 13 in the cloud server 20, not in the application server 30.

Function Configuration

Figure 16:
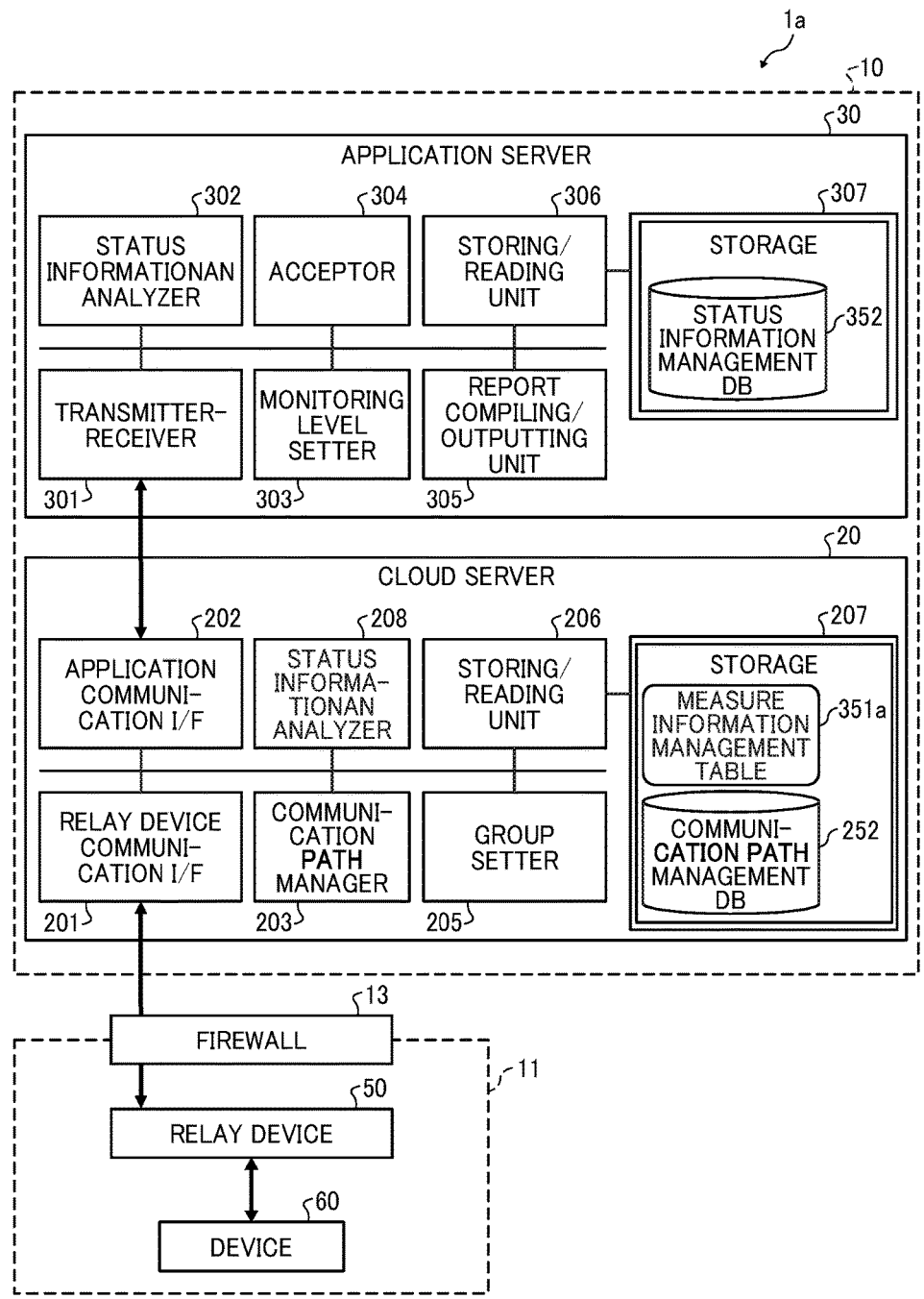
FIG. 16 is a diagram illustrating one example of a function configuration of a cloud server and an application server according to variation 1 of the first embodiment.

FIG. 16 is a diagram illustrating one example of a function configuration of a cloud server and an application server according to variation 1 of the first embodiment. Functions achieved by the cloud server 20 illustrated in FIG. 16 include a status information analyzer 208 as an alternative to the alert policy manager 204 of the first embodiment. The cloud server 20 illustrated in FIG. 16 stores a measure information management table 351*a* in the storage 207.

The status information analyzer 208 is a function unit that determines measure information to be a preventive measure for the relay device 50 on the basis of the content of the status information 580 acquired from the relay device 50. Specifically, the status information analyzer 208 uses the measure information management table 351*a* stored in the storage 207 to determine measure information for the relay device 50. The status information analyzer 208 is implemented by, for example, a program or the like executed by the CPU 1001 illustrated in FIG. 3.

FIG. 17 is a diagram illustrating one example of a measure information management table according to variation 1 of the first embodiment. The measurement information management table 351*a* illustrated in FIG. 17 is a table that summarizes information contained in the alert policy 251 illustrated in FIG. 6 and information contained in the measurement information management table 351 illustrated in FIG. 7. That is, the measure information management table 351*a* does not include the "condition ID" included in the alert policy 251 and the measure information management table 351. With this, when the information contained in status information 580 received from the relay device 50 fulfills the "condition" included in the measure information management table 351*a*, the cloud server 20 according to variation 1 of the first embodiment can determine measure information related with the condition.

Device Management Method

Figure 18:
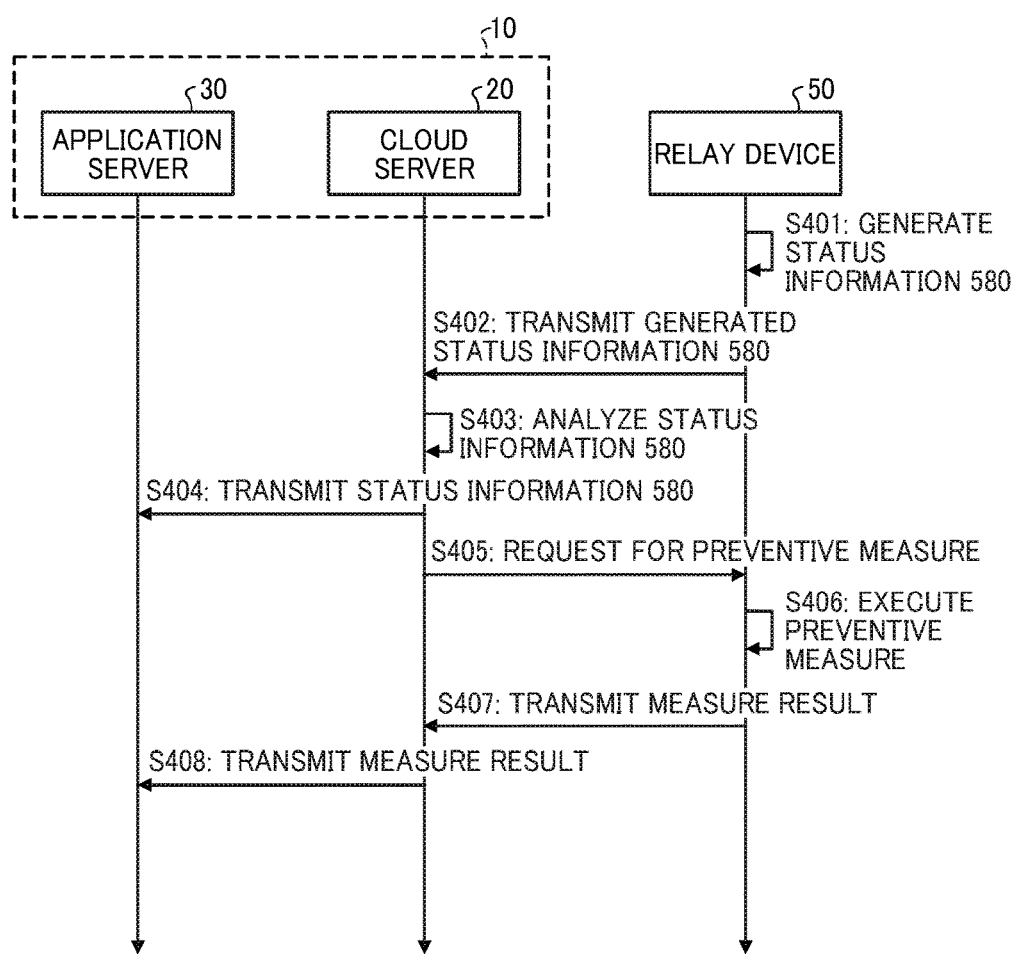
FIG. 18 is a sequence diagram illustrating one example of an device management method in a remote management system according to variation 1 of the first embodiment.

FIG. 18 is a sequence diagram illustrating one example of an device management method in a remote management system according to variation 1 of the first embodiment. Processes of steps S401 and S402 are similar to those of steps S101 and S102 illustrated in FIG. 10, and thus the description thereof is omitted.

Figure 19:
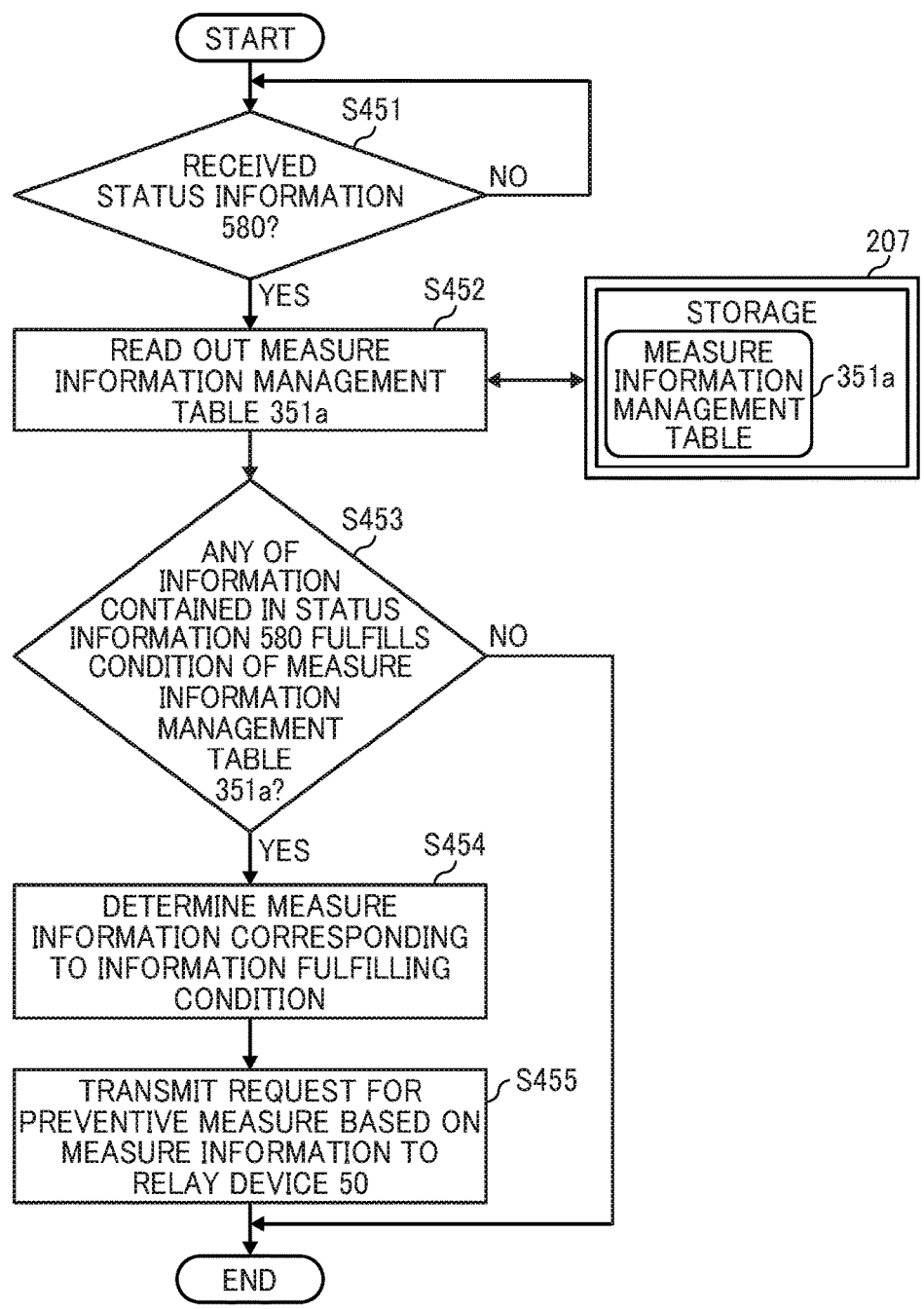
FIG. 19 is a flowchart illustrating one example of a process for determining measure information in the cloud server according to variation 1 of the first embodiment.

In step S403, the cloud server 20 analyzes the received status information 580. Here, a process for determining measure information in the cloud server 20 will be described. FIG. 19 is a flowchart illustrating one example of a process for determining measure information in the cloud server according to variation 1 of the first embodiment. In step S451, when receiving the status information 580 from the relay device 50, the relay device communication I/F 201 of the cloud server 20 proceeds to a process of step S452. When not receiving the status information 580 from the relay device 50, the relay device communication I/F 201 of the cloud server 20 repeats the process of step S451.

In step S452, the status information analyzer 208 of the cloud server 20 reads out the measure information management table 351a stored in the storage 207. More specifically, the status information analyzer 208 outputs a readout request of the measure information management table 351a to the storing/reading unit 206. Upon detecting the output readout request, the storing/reading unit 206 reads out the measure information management table 351a stored in the storage 207. Then, the storing/reading unit 206 outputs the read out measure information management table 351a to the status information analyzer 208.

In step S453, if any of the received information contained in the status information 580 fulfills a condition of measure information management table 351a, the status information analyzer 208 of the cloud server 20 proceeds to a process of step S454. If none of the received information contained in the status information 580 fulfills the condition of measure information management table 351a, the status information analyzer 208 of the cloud server 20 terminates the process. A judging method of "whether there is information fulfilling the condition" is similar to the content illustrated in step S203 of FIG. 11.

In step S454, the status information analyzer 208 of the cloud server 20 determines measure information corresponding to the information fulfilling the condition. For example, if a condition "900 MB or more" of the item "memory" in the measurement information management table 351a illustrated in FIG. 17 is fulfilled, the status information analyzer 208 determines "reboot process" as the measure information. In step S455, the relay device communication I/F 201 of the cloud server 20 transmits a request for a preventive measure based on the determined measure information to the relay device 50. Content and a format of the request for the preventive measure are the same as those of the request for the preventive measure 120 illustrated in FIG. 14.

Referring back to FIG. 18, the description of the device management method in the remote management system according to variation 1 of the first embodiment will be continued. In step S404, the cloud server 20 transmits the status information 580 to the application server 30. When receiving the status information 580, the application server 30 stores the received status information 580 in the status information management DB 352. In step S405, the cloud server 20 transmits to the relay device 50 a request for a preventive measure based on the determined measure information as illustrated in FIG. 19. An order of processes in step S404 and step S405 may be performed out of sequence or in parallel. Processes of steps S406 to S408 are similar to those of steps S108 to S110 illustrated in FIG. 10, and thus the description thereof is omitted.

Therefore, in the remote management system according to variation 1 of the first embodiment, the cloud server 20 is responsible for processes from when a sign of failure (abnormality) of the relay device 50 is detected and until a preventive measure is specified. Therefore, the remote management system according to variation 1 of the first embodiment can reduce a process burden of the application server 30 or can be applied even in a use environment where the application server 30 is not provided.

Variation 2 of the First Embodiment

Next, variation 2 of the first embodiment will be described. The remote management system according to variation 2 of the first embodiment does not perform the process for judging necessity for an alert in the cloud server 20 but performs a specific process of a preventive measure for the relay device 50 in the application server 30.

Function Configuration

Figure 20:
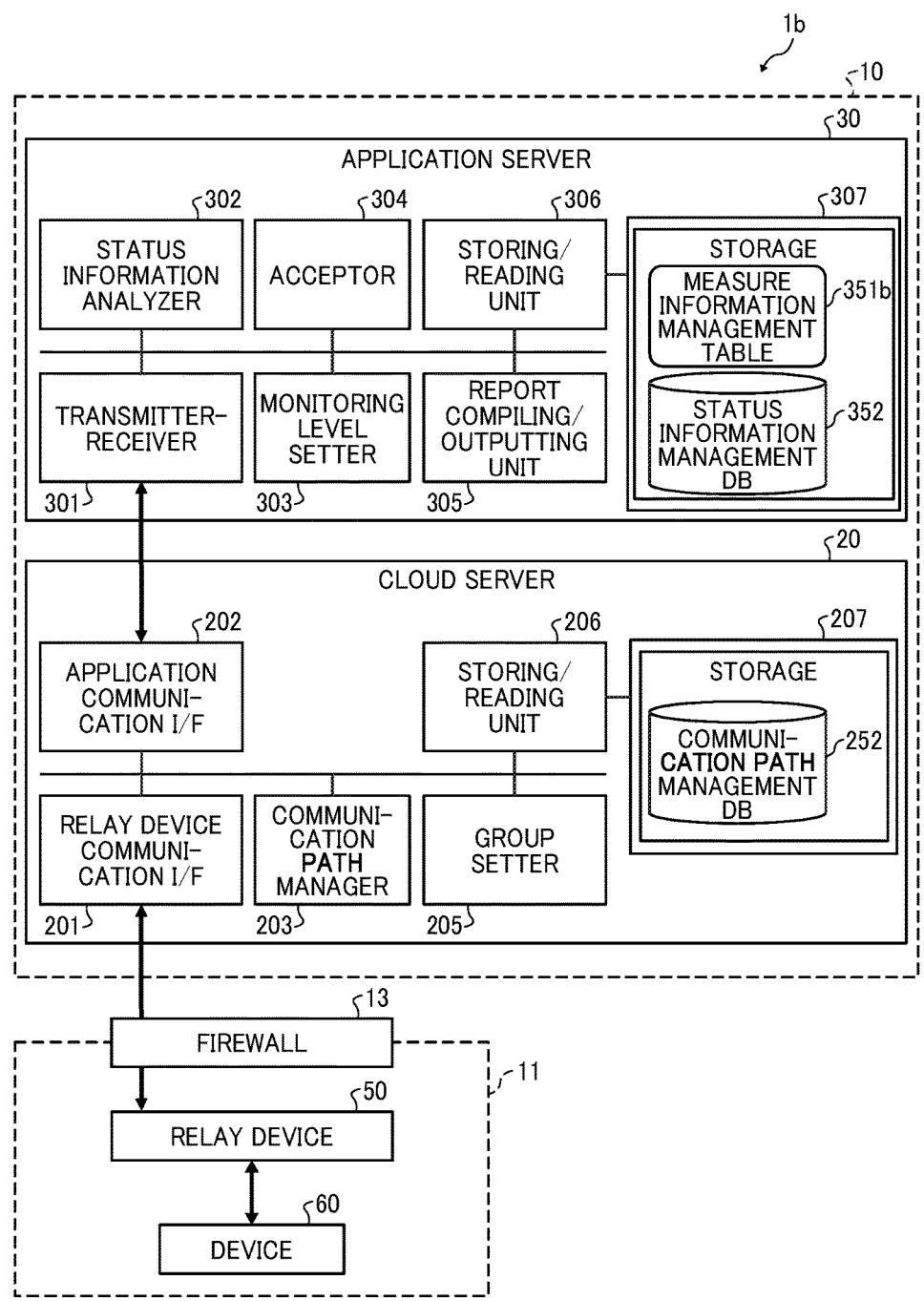
FIG. 20 is a diagram illustrating one example of a function configuration of a cloud server and an application server according to variation 2 of the first embodiment.

FIG. 20 is a diagram illustrating one example of a function configuration of a cloud server and an application server according to variation 2 of the first embodiment. In addition to the functions of the first embodiment, the application server 30 illustrated in FIG. 20 stores the measure information management table 351b in the storage 307. The measure information management table 351b has a same configuration as that of the measure information management table 351a illustrated in FIG. 17. When receiving the status information 580 of the relay device 50 from the cloud server 20, the status information analyzer 302 uses the measure information management table 351b stored in the storage 307 to determine measure information for improving a sign of failure (abnormality) of the relay device 50.

The remote management system 1b does not perform the judgment of necessity for an alert in the cloud server 20. Thus, the cloud server 20 illustrated in FIG. 20 may not be provided with a configuration of the alert policy manager 204. In addition, the remote management system 1b may not store the alert policy 251 in the storage 207 of the cloud server 20 illustrated in FIG. 20.

Device Management Method

Figure 21:
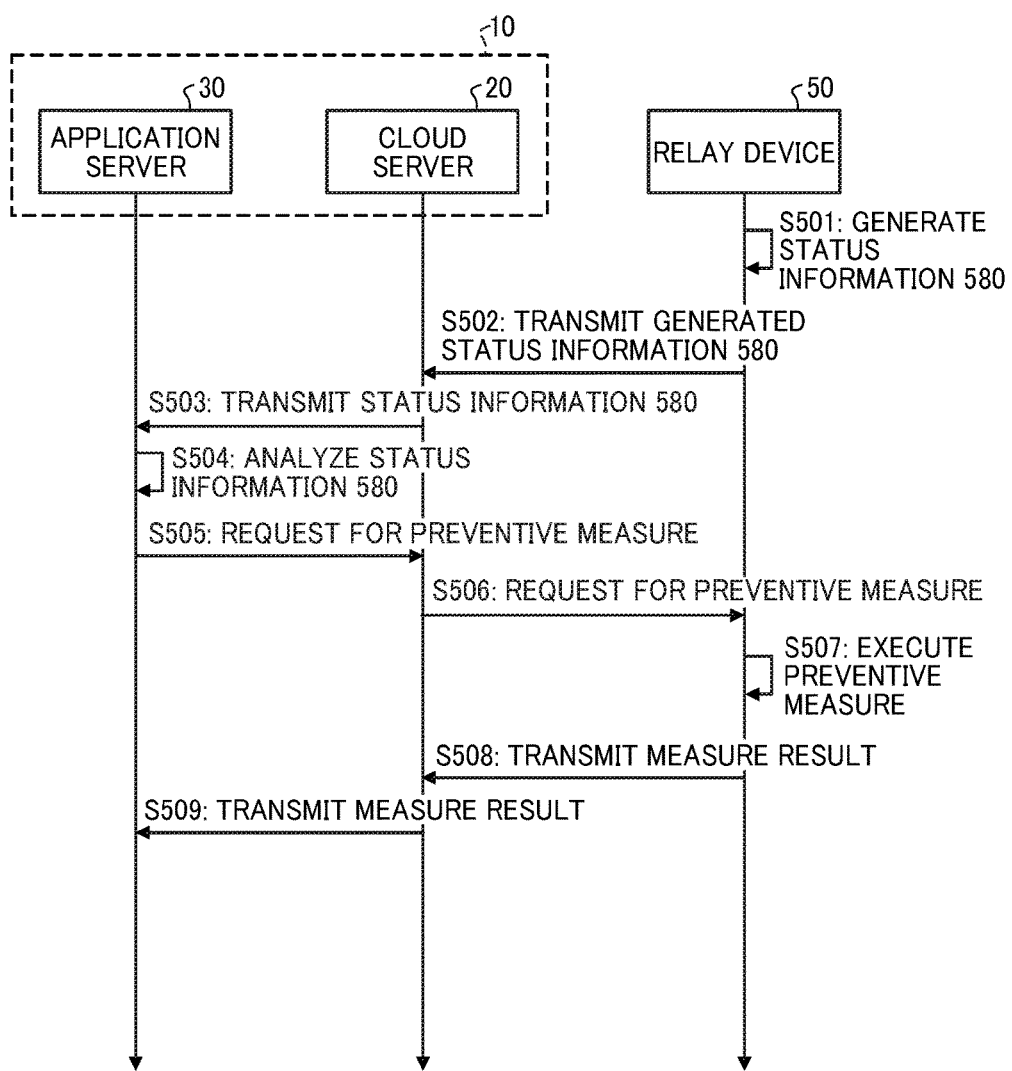
FIG. 21 is a sequence diagram illustrating one example of a device management method in a remote management system according to variation 2 of the first embodiment.

FIG. 21 is a sequence diagram illustrating one example of an device management method in a remote management system according to variation 2 of the first embodiment. Processes of steps S501 and S502 are similar to those of steps S101 and S102 illustrated in FIG. 10, and thus the description thereof is omitted.

In step S503, the cloud server 20 transmits the status information 580 of the relay device 50 to the application server 30. The cloud server 20 may determine necessity for transmission of the status information 580 on the basis of a group set in the group setter 205.

Figure 22:
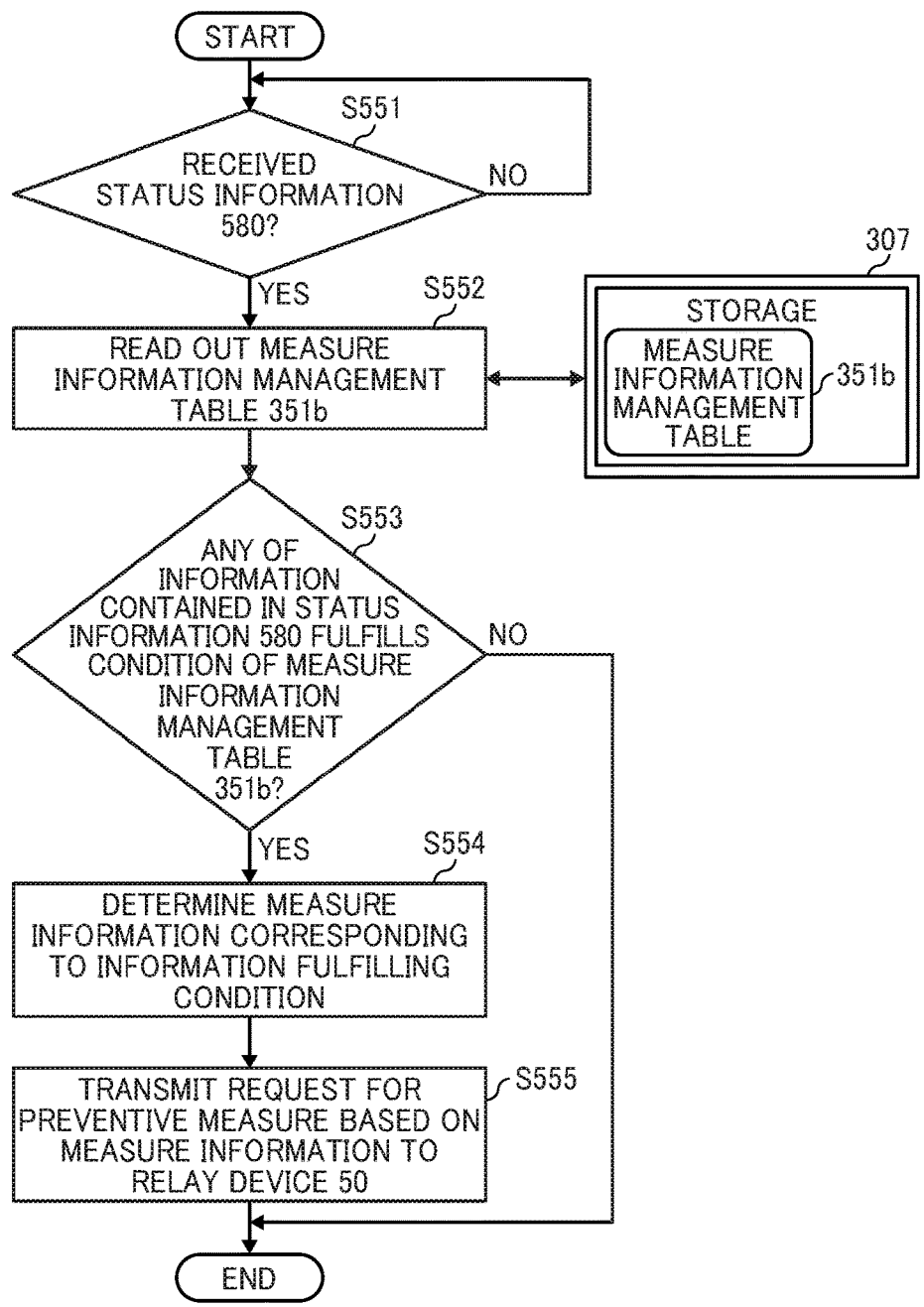
FIG. 22 is a flowchart illustrating one example of a process for determining measure information in the application server according to variation 2 of the first embodiment.

In step S504, when receiving the status information 580 of the relay device 50 from the cloud server 20, the application server 30 analyzes the status information 580. Here, a process for determining measure information in the application server 30 will be described. FIG. 22 is a flowchart illustrating one example of a process for determining measure information in the application server according to variation 2 of the first embodiment.

In step S551, when receiving the status information 580 of the relay device 50 from the cloud server 20, the transmitter-receiver 301 of the application server 30 proceeds to a process of step S552. When not receiving the status information 580 of the relay device 50 from the cloud server 20, the transmitter-receiver 301 of the application server 30 repeats the process of step S551.

In step S552, the status information analyzer 302 of the application server 30 reads out the measure information management table 351b stored in the storage 307. More specifically, the status information analyzer 302 outputs a readout request of the measure information management table 351b to the storing/reading unit 306. Upon detecting the output readout request, the storing/reading unit 306 reads out the measure information management table 351b stored in the storage 307. Then, the storing/reading unit 306 outputs the read out measure information management table 351b to the status information analyzer 302.

In step S553, if any of the received information contained in the status information 580 fulfills a condition of measure information management table 351b, the status information analyzer 302 of the application server 30 proceeds to a process of step S554. If none of the received information contained in the status information 580 fulfills the condition of the measure information management table 351b, the status information analyzer 302 of the application server 30 terminates the process. A judging method of "whether there is information fulfilling the condition" is similar to the content illustrated in step S203 of FIG. 11.

In step S554, the status information analyzer 302 of the application server 30 determines measure information corresponding to information fulfilling the condition. The determining method by the status information analyzer 302 is similar to the process of the status information analyzer 208 of the cloud server 20 illustrated in step S454 of FIG. 19. In step S555, the transmitter-receiver 301 of the application server 30 transmits to the cloud server 20 a request for a preventive measure based on the determined measure information. Content and a format of the request for the preventive measure are the same as those of the request for the preventive measure 120 illustrated in FIG. 14.

Referring back to FIG. 21, the description of the device management method in the remote management system according to variation 2 of the first embodiment will be continued. In step S505, the application server 30 transmits to the cloud server 20 a request for a preventive measure based on the determined measure information. Processes of steps S506 to S509 are similar to those in steps S107 to S110 illustrated in FIG. 10, and thus the description thereof is omitted.

Therefore, in the remote management system according to variation 2 of the first embodiment, the application server 30 is responsible for processes from when a sign of failure (abnormality) of the relay device 50 is detected and until the preventive measure is specified. Therefore, the remote management system 1b can reduce a process burden of the cloud server 20 or can be applied even in a use environment where the cloud server 20 is not provided.

Second Embodiment

Next, a remote management system according to a second embodiment will be described. A same configuration and a same function as those of the first embodiment are denoted by same reference numerals, and the description thereof is omitted. The remote management system according to the second embodiment performs a process in a case where an abnormal reboot occurs in the relay device 50. The remote management system 1d transmits information indicating occurrence of the abnormal reboot from the relay device 50 to the device management system 10. Then, the remote management system 1d analyzes a cause of the abnormal reboot in the device management system 10 and transmits a countermeasure request to the relay device.

Function Configuration

Figure 23:
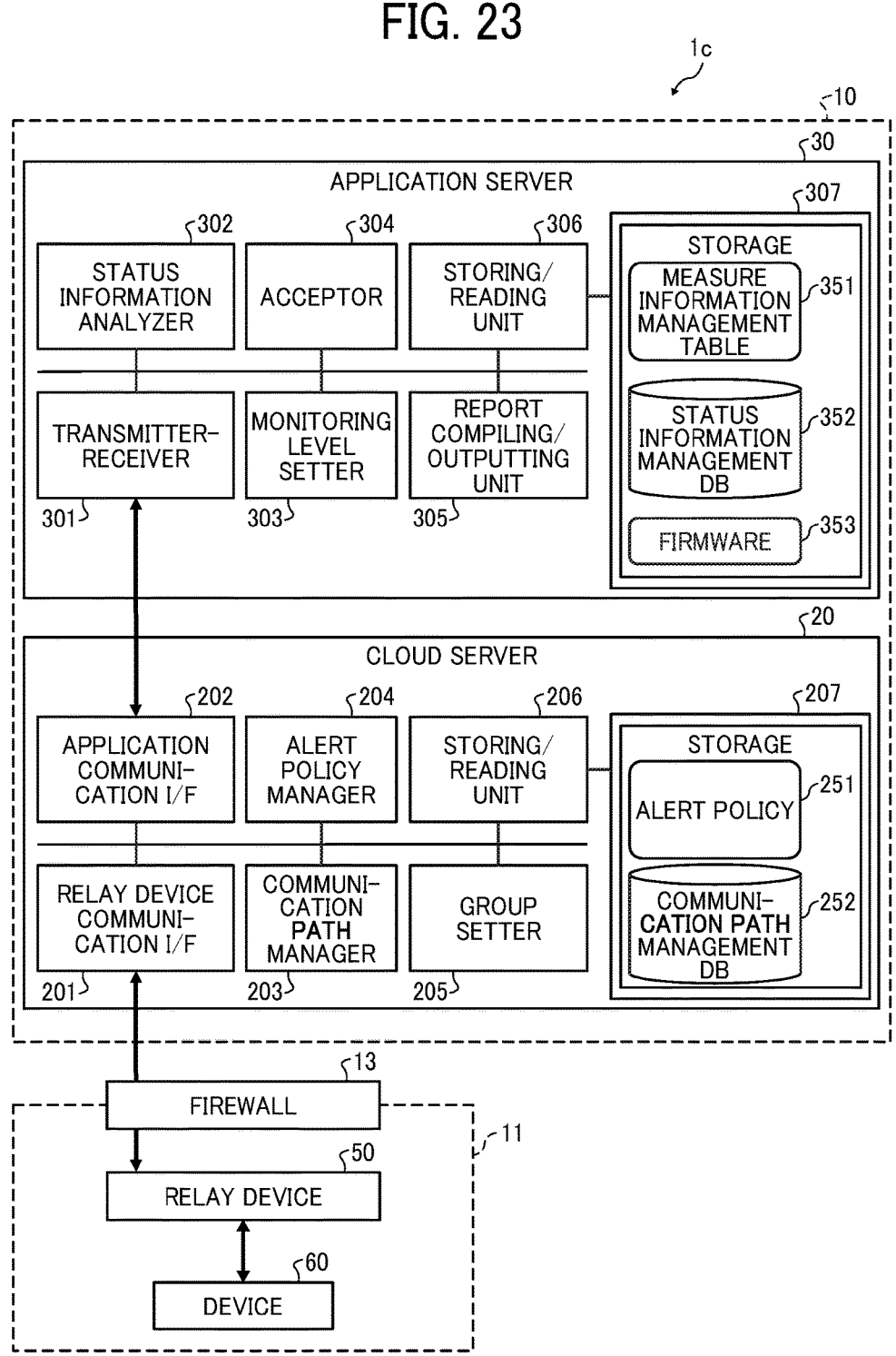
FIG. 23 is a diagram illustrating one example of a function configuration of a cloud server and an application server according to a second embodiment.

FIG. 23 is a diagram illustrating one example of a function configuration of a cloud server and an application server according to a second embodiment. In addition to the functions of the first embodiment, the application server 30 according to the second embodiment stores firmware 353 in the storage 307. The firmware 353 is software distributed to the relay device 50 in order to control the relay device 50. The application server 30 transmits the firmware 353 to the relay device 50 via the cloud server 20. When receiving the firmware 353 from the application server 30, the relay device 50 executes update of the firmware.

Device Management Method

Figure 24:
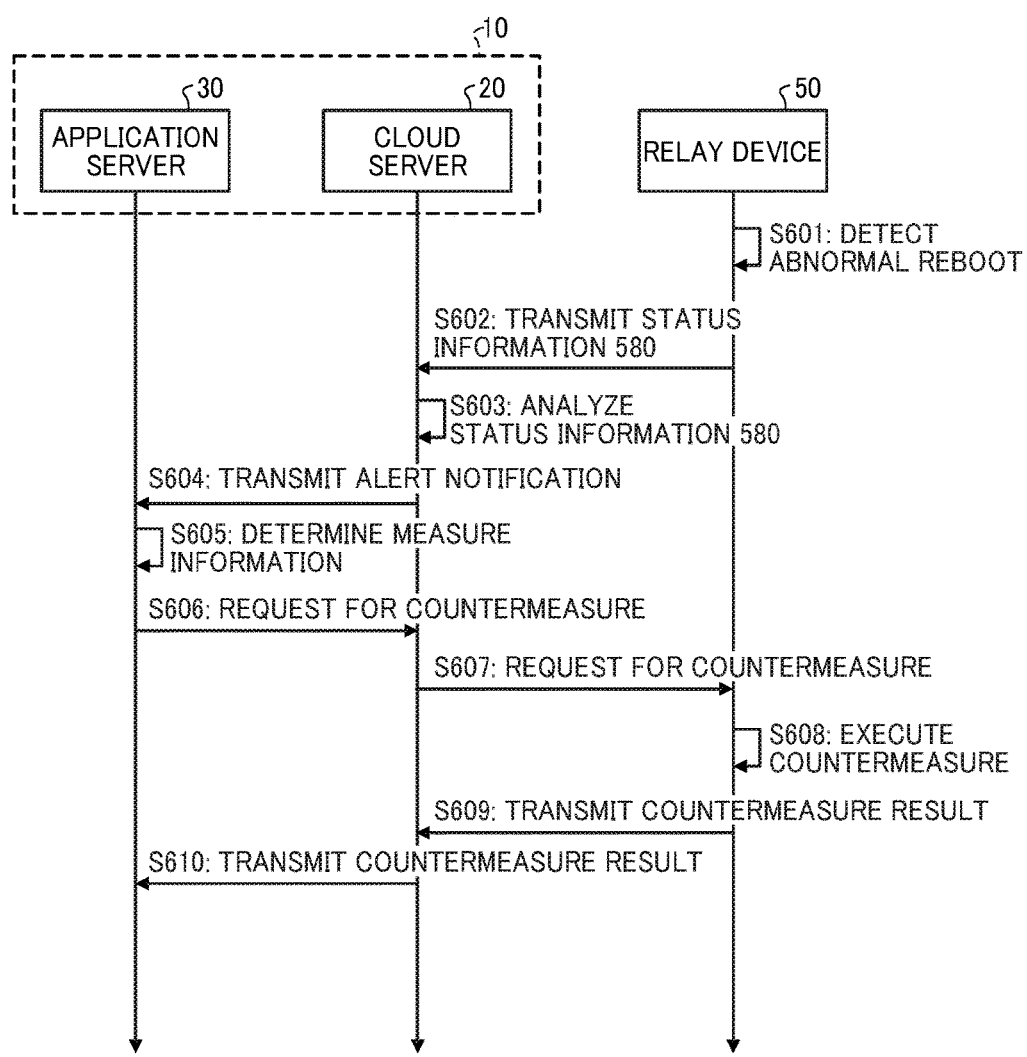
FIG. 24 is a sequence diagram illustrating one example of a device management method in a remote management system according to the second embodiment.

FIG. 24 is a sequence diagram illustrating one example of an device management method in a remote management system according to the second embodiment. FIG. 24 illustrates an example in which the firmware before update is installed in the relay device 50. In addition, in the alert policy 251 stored in the storage 207 of the cloud server 20, content indicating that "firmware version is not latest" is set as a condition of an item "firmware". In the measure information management table 351 stored in the storage 307 of the application server 30, content indicating that "update firmware" is set as measure information corresponding to the above condition.

In step S601, the relay device 50 detects occurrence of an abnormal reboot. The abnormal reboot is a reboot generated automatically at an unexpected time. Upon detecting the occurrence of the abnormal reboot, the relay device 50 generates the status information 580 including information indicating that the abnormal reboot has occurred. The status information 580 includes version information of firmware being executed (before update) in addition to the information illustrated in FIGS. 8A and 8B.

In step S602, the relay device 50 transmits the generated status information 580 to the cloud server 20. In step S603, when receiving the status information 580 from the relay device 50, the cloud server 20 analyzes the received status information 580. Here, the status information 580 transmitted from the relay device 50 includes the version information of the firmware before update. Therefore, the condition included in the alert policy 251 stored in the storage 207 is fulfilled. Thus, the alert policy manager 204 of the cloud server 20 judges so as to transmit an alert notification.

In step S604, the cloud server 20 transmits the alert notification to the application server 30. The alert notification includes the version information of the firmware being executed in the relay device 50. A configuration of the alert notification may be the same as that of the alert notification 110 illustrated in FIG. 12. In step S605, when receiving the alert notification from the cloud server 20, the application server 30 specifies a preventive measure for the relay device 50. Specifically, the status information analyzer 302 of the application server 30 determines, in the measure information management table 351 stored in the storage 307, measure information associated with a condition ID that is same as a condition ID included in the received alert notification. Here, content of the determined measure information is "firmware update".

In step S606, the application server 30 transmits to the cloud server 20 a countermeasure request including the determined measure information. Here, since the determined measure information is firmware update, the application server 30 transmits the firmware 353 together with the countermeasure request. A configuration of the countermeasure request may be the same as that of the request for the preventive measure 120 illustrated in FIG. 14. In step S607, the cloud server 20 transfers to the relay device 50 the countermeasure request transmitted from the application server 30. In step S608, when receiving the countermeasure request from the cloud server 20, the relay device 50 executes the requested countermeasure. Specifically, the relay device 50 uses the firmware 353 transmitted together with the countermeasure request to update the firmware being executed.

In step S609, upon completion of the requested countermeasure, the relay device 50 transmits a countermeasure result notification to the cloud server 20. The countermeasure result notification includes version information of the updated firmware. A configuration of the countermeasure result notification may be the same as that of the measure result notification 130 illustrated in FIG. 15. In step S610, the cloud server 20 transfers to the application server 30 the countermeasure result notification transmitted from the relay device 50.

In the above description, an example in which the firmware of the relay device 50 is updated as a countermeasure against the occurrence of the abnormal reboot in the relay device 50 is illustrated. However, a countermeasure determined in the device management system 10 is not limited to this. For example, the device management system 10 may determine a countermeasure to be requested to the relay device 50 in the same manner as the specific process of the preventive measure illustrated in the first embodiment. In addition, the device management system 10 may accumulate log information acquired from the relay device 50 and have Artificial Intelligence (AI) to learn a pattern of the log to analyze the cause.

The relay device 50 may be configured not to transmit log information (the status information 580) when the abnormal reboot occurs. For example, when restriction on volume of communication with the device management system 10 is severe, the relay device 50 may suspend transmission of the log information to the device management system 10, and when restriction on the volume of the communication is loose, the relay device 50 may transmit the log information to the device management system 10. This enables an appropriate system operation according to the communication volume between the device management system 10 and the relay device 50.

As described above, when the abnormal reboot occurs in the relay device 50, the remote management system according to the second embodiment detects a failure (abnormality) of the relay device 50 and makes a countermeasure request in the device management system 10 without depending on the preset task schedule 552. Therefore, a remote management system 1c can devise a countermeasure at an early stage even if the failure (abnormality) occurs in the relay device 50. Thus, the system can be continuously and normally operated.

Third Embodiment

Next, a remote management system according to a third embodiment will be described. A same configuration and a same function as those in the first embodiment or the second embodiment are denoted by same reference numerals, and the description thereof is omitted. In the device management system 10, the remote management system 1d is a system for detecting a sign of failure (abnormality) of not only the relay device 50 but also the device 60 connected to the relay device 50.

Function Configuration

Figure 25:
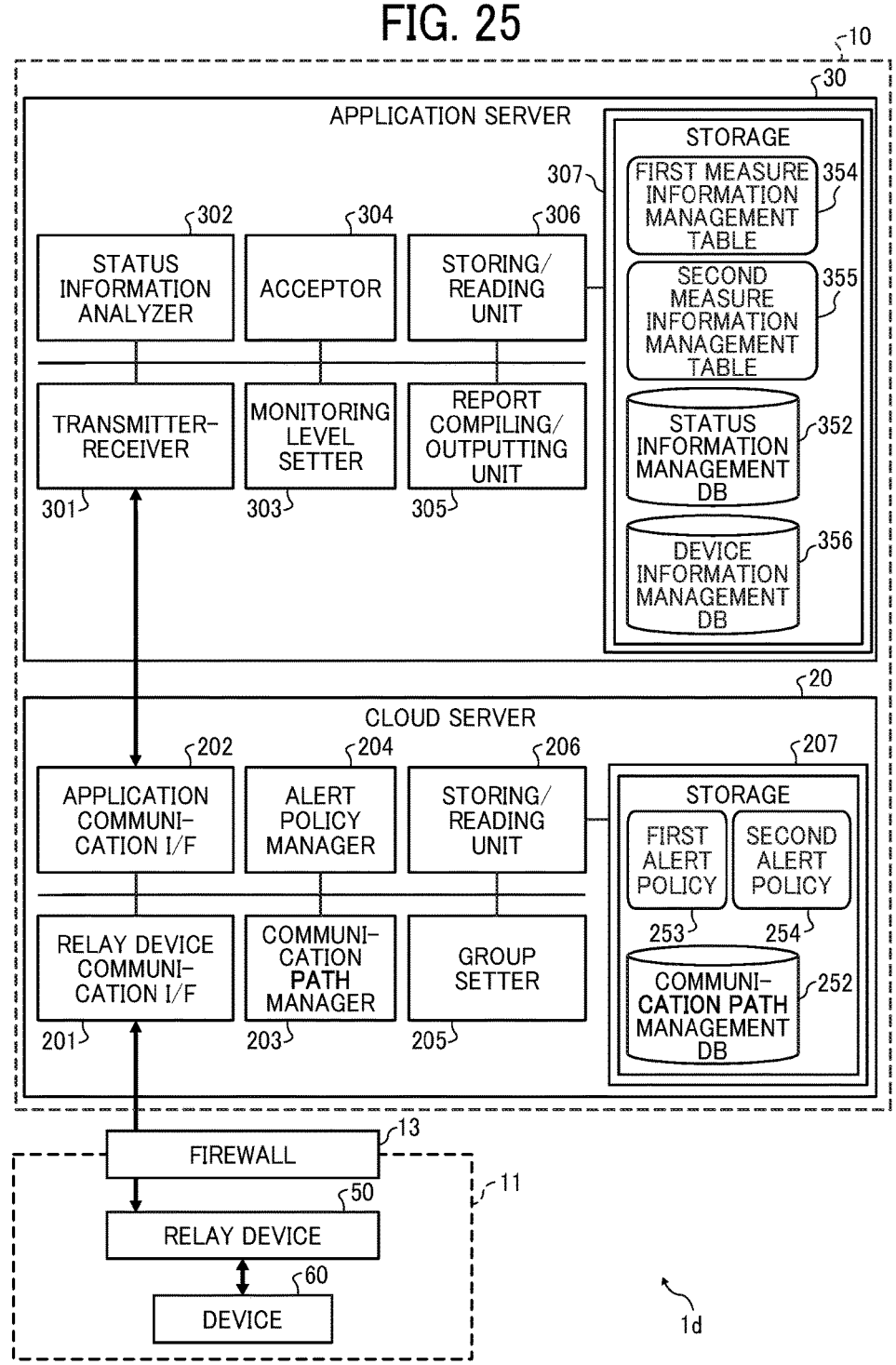
FIG. 25 is a diagram illustrating one example of a function configuration of a cloud server and an application server according to a third embodiment.

FIG. 25 is a diagram illustrating one example of a function configuration of a cloud server and an application server according to a third embodiment. In addition to the functions of the first embodiment or the second embodiment, the cloud server 20 illustrated in FIG. 25 stores a first alert policy 253 and a second alert policy 254 in the storage 207.

The first alert policy 253 has a same configuration as that of the alert policy 251. A monitoring object of the first alert policy 253 (alert policy 251) is the relay device 50 which is a general computer. Thus, the first alert policy 253 may include information indicating a status of a general-purpose computer resource. A monitoring object of the second alert policy 254 is different types of device 60. Thus, the second alert policy 254 includes, in addition to the information indicating the status of the general-purpose computer resource, information indicating an operating status particular to the device 60.

FIG. 26 is a diagram illustrating one example of a second alert policy according to the third embodiment. The second alert policy 254 illustrated in FIG. 26 is one example in which the device 60 is a projector (PJ). The second alert policy 254 illustrated in FIG. 26 includes, for example, information indicating an operating status of a projection lamp of the PJ in addition to information indicating a status of a general-purpose computer resource such as a CPU, a memory, a storage, and a power supply. A "condition" for judging necessity for an alert notification included in the second alert policy 254 is for detecting a sign of failure (abnormality) of the device 60 for example, which is one example of a second condition.

The second alert policy 254 may include not only text information but also sound information, for example. Specifically, the second alert policy 254 sets as a condition information on sound emitted when a failure occurs in the device 60. The cloud server 20 may be configured to transmit an alert notification upon detection of a sign of failure (abnormality) of the device 60 when the device information transmitted from the device 60 includes information of sound fulfilling the condition. In addition, the second alert policy 254 may be provided for each piece of the device 60, and the item and the condition may be changed according to a type of the device 60.

In addition to the functions of the first embodiment or the second embodiment, the application server 30 illustrated in FIG. 25 stores a first measure information management table 354 and a second measure information management table 355 in the storage 307. The first measure information management table 354 is the same as the measurement information management table 351 illustrated in FIG. 7 and manages measure information for improving s sign of failure (abnormality) of the relay device 50. The second measure information management table 355 is for managing measure information for improving a sign of failure (abnormality) of the device 60.

FIG. 27 is a diagram illustrating one example of a second measure information management table according to the third embodiment. Similarly, to the first measure information management table 354, the second measure information management table 355 illustrated in FIG. 27 associates, "measure information" instructing prevention of further detection of the sign of failure, with the "condition ID" to manage. The "condition ID" corresponds to the "condition ID" included in the second alert policy 254 illustrated in FIG. 26.

The status information analyzer 302 determines as measure information for the device 60 the "measure information" associated with the "condition ID" that is same as the "condition ID" included in the alert notification received from the cloud server 20. When there are a plurality of the second alert policies 254, there are a plurality of the second measure information management tables 355 associated with the second alert policies 254. In addition, the second measure information management table 355 may be provided for each piece of the device 60, and the measure information may be changed according to a type of the device 60. The measure information included in the second measure information management table 355 is one example of second instruction information instructing the device 60 to execute a predetermined process.

The application server 30 illustrated in FIG. 25 builds an device information management DB 356 in the storage 307. The device information management DB 356 manages device information indicating a resource status and an operating status of the device 60 acquired from the device 60. The device information includes, for example, information of an "item" included in the second alert policy 254 illustrated in FIG. 26.

Device Management Method

Figure 28:
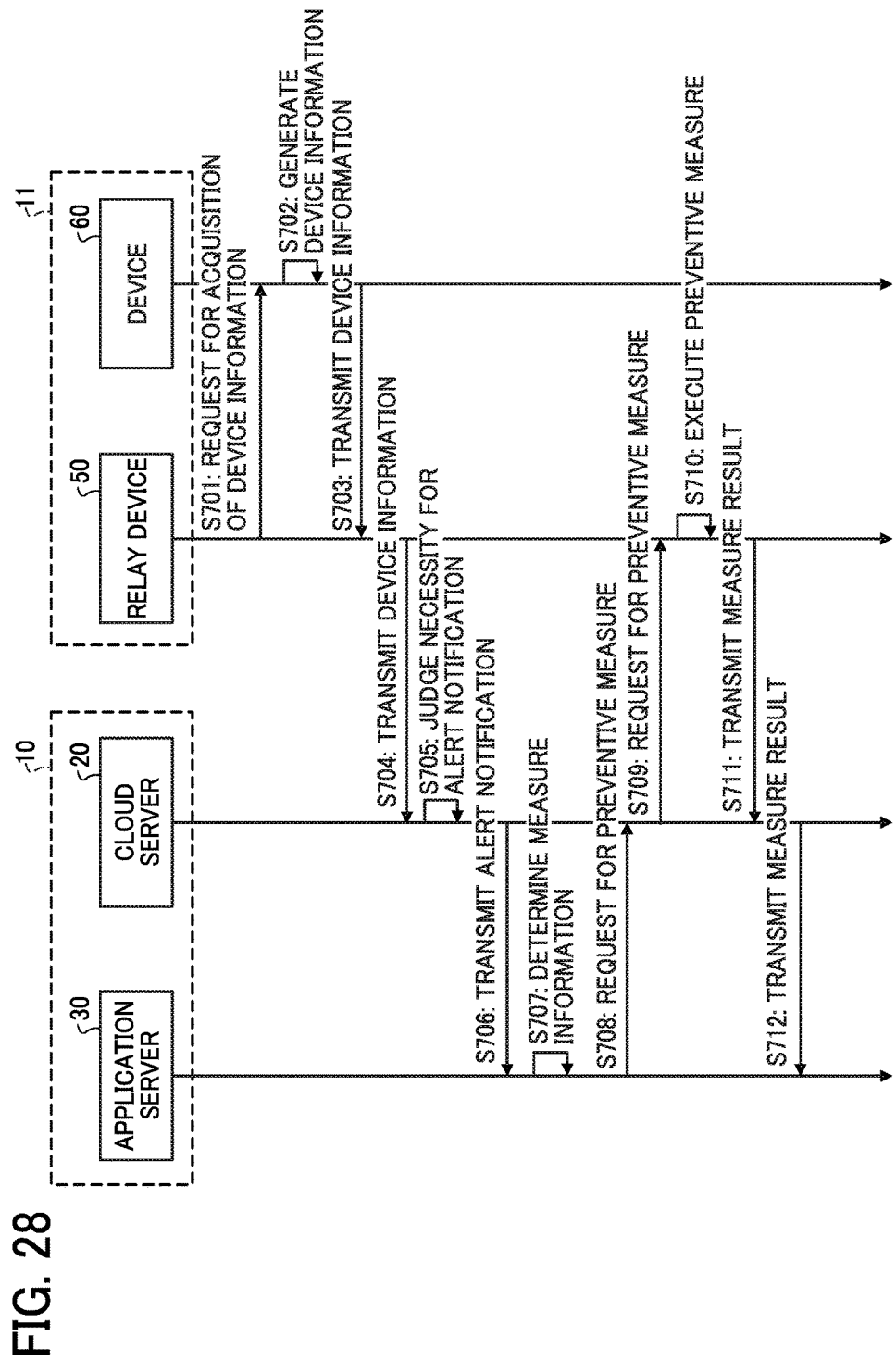
FIG. 28 is a sequence diagram illustrating one example of a device management method in a remote management system according to the third embodiment.

FIG. 28 is a sequence diagram illustrating one example of an device management method in a remote management system according to the third embodiment. While FIG. 28 illustrates an example in which the device management system 10 acquires device information from one piece of the device 60 via the relay device 50, the device information of a plurality of pieces of the device 60 may be acquired via one relay device 50.

In step S701, the relay device 50 transmits a request for acquisition of device information to the device 60. Under control of the scheduler function unit 503, the device communication I/F 502 of the relay device 50 transmits the request for acquisition of the device information to the device 60 on the basis of a predetermined schedule (the task schedule 552). In step S702, when receiving the request for acquisition of the device information from the relay device 50, the device information generator 602 of the device 60 generates device information indicating a resource status and an operating status of the device 60. In step S703, the transmitter-receiver 601 of the device 60 transmits the generated device information to the relay device 50.

In step S704, the relay device 50 transmits to the cloud server 20 the device information transmitted from the device 60. Here, a process of step S704 is performed on the basis of a schedule indicated in the task schedule 552 stored in the storage 508 of the relay device 50.

In step S705, when receiving the device information from the relay device 50, the cloud server 20 uses the second alert policy 253 to judge necessity for an alert notification for the application server 30. The process for judging necessity for an alert notification using the second alert policy 253 is similar to the process for judging necessity for an alert notification using the alert policy 251 illustrated in FIG. 11. In addition, in a process of step S705, the alert policy manager 204 of the cloud server 20 judges so as to transmit the alert notification. In step S706, the cloud server 20 transmits the alert notification to the application server 30.

In step S707, when receiving the alert notification from the cloud server 20, the application server 30 uses the second measure information management table 355 to determine measure information for improving a sign of failure (abnormality) of the device 60. A specific process of a preventive measure using the second measure information management table 355 is similar to that of a preventive measure using the measure information management table 351 illustrated in FIG. 13. In step S708, the application server 30 transmits to the cloud server 20 a request for a preventive measure based on the determined measure information. In step S709, the cloud server 20 transfers to the relay device 50 the request for the preventive measure transmitted from the application server 30.

In step S710, when receiving the request for the preventive measure from the cloud server 20, the relay device 50 executes for the device 60 a measure corresponding to the measure information included in the request for the preventive measure. The relay device 50 may transfer to the device 60 the request for the preventive measure and cause the device 60 itself to execute the measure corresponding to the measure information.

In step S711, when the preventive measure of the device 60 is terminated, the relay device 50 transmits a measure result notification to the cloud server 20 as feedback to the request for the preventive measure. In step S712, the cloud server 20 transfers to the application server 30 the measurement result notification received from the relay device 50. A configuration of the measurement result notification may be the same as that of the measure result notification 130 illustrated in FIG. 15.

By acquiring the measure result notification from the relay device 60, the application server 30 can know a measure result for a command issued by itself. The application server 30 may update content of the second measure information management table 355 on the basis of content of the acquired measure result notification.

As described above, in the remote management system according to the third embodiment, the device management system 10 collects not only a log of the relay device 50 but also a log of the device 60. Therefore, the remote management system 1d can preliminarily detect a sign of failure (abnormality) of the managed device 60 and can cause the device 60 to execute a preventive measure. Thus, a system can be continuously and normally operated including an internal environment of the local network 11.

Fourth Embodiment

Next, a remote management system according to a fourth embodiment will be described. A same configuration and a same function as those in the first to third embodiments are denoted by same reference numerals, and the description thereof is omitted. A remote management system 1e can acquire a log not only by a log up from the relay device 50 by a preset schedule control but also by the application server 30 at a time at which the application server 30 desires to acquire the log. Thus, the remote management system 1e can detect a sign of failure to perform a preventive measure.

Function Configuration

Figure 29:
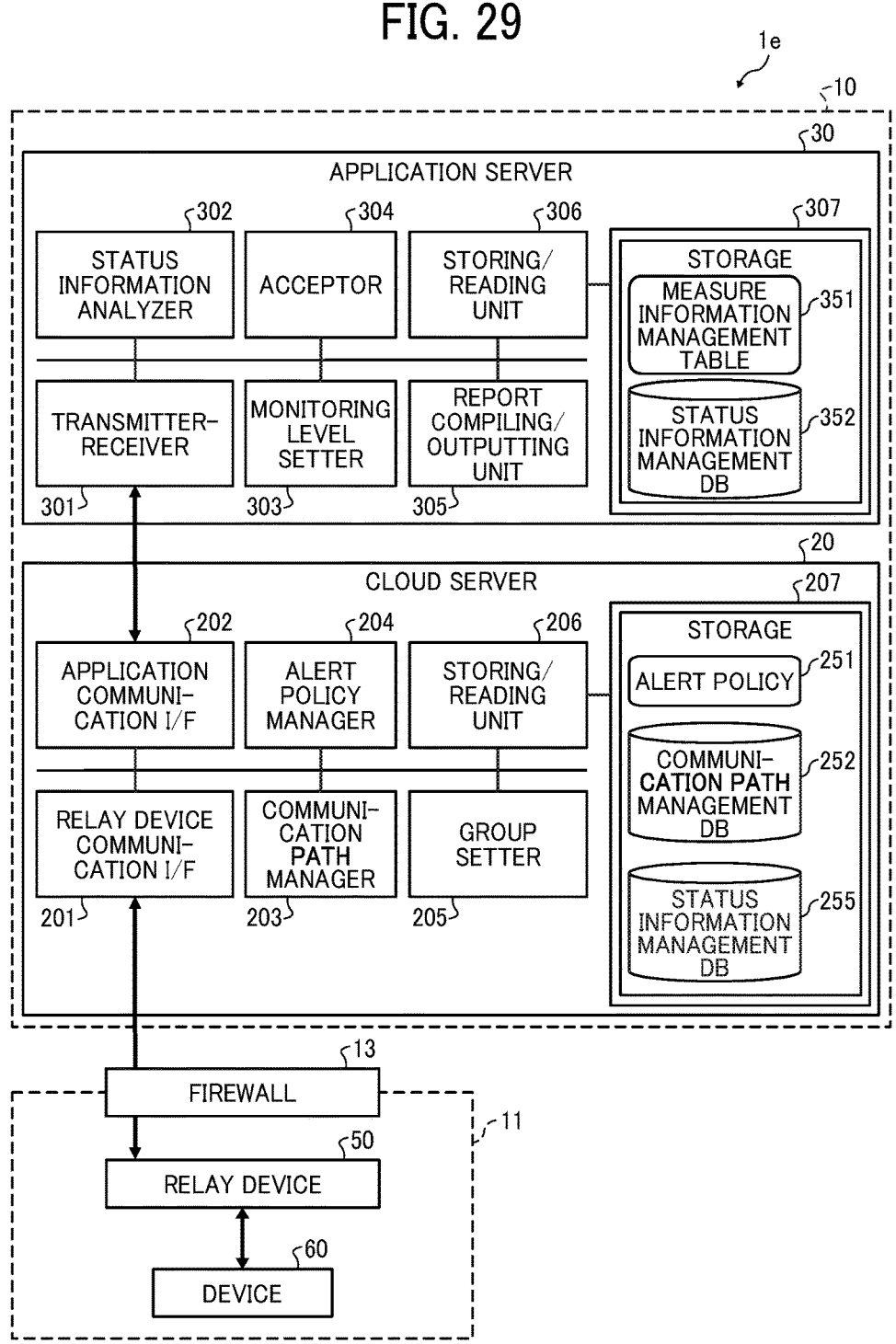
FIG. 29 is a diagram illustrating one example of a function configuration of a cloud server and an application server according to a fourth embodiment.

FIG. 29 is a diagram illustrating one example of a function configuration of a cloud server and an application server according to a fourth embodiment. The cloud server 20 illustrated in FIG. 29 builds a status information management DB 255 in the storage 207. The status information management DB 255 illustrated in FIG. 29 stores status information acquired from the relay device 50. FIG. 30 is a diagram illustrating one example of information managed by the status information management DB according to the fourth embodiment. Management information 590 illustrated in FIG. 30 associates a log ID with each status information 580 received from the relay device 50. The management information 590 includes information included in a message field of the status information 580 illustrated in FIG. 8A, that is, information illustrated in FIG. 8B.

Device Management Method

Figure 31:
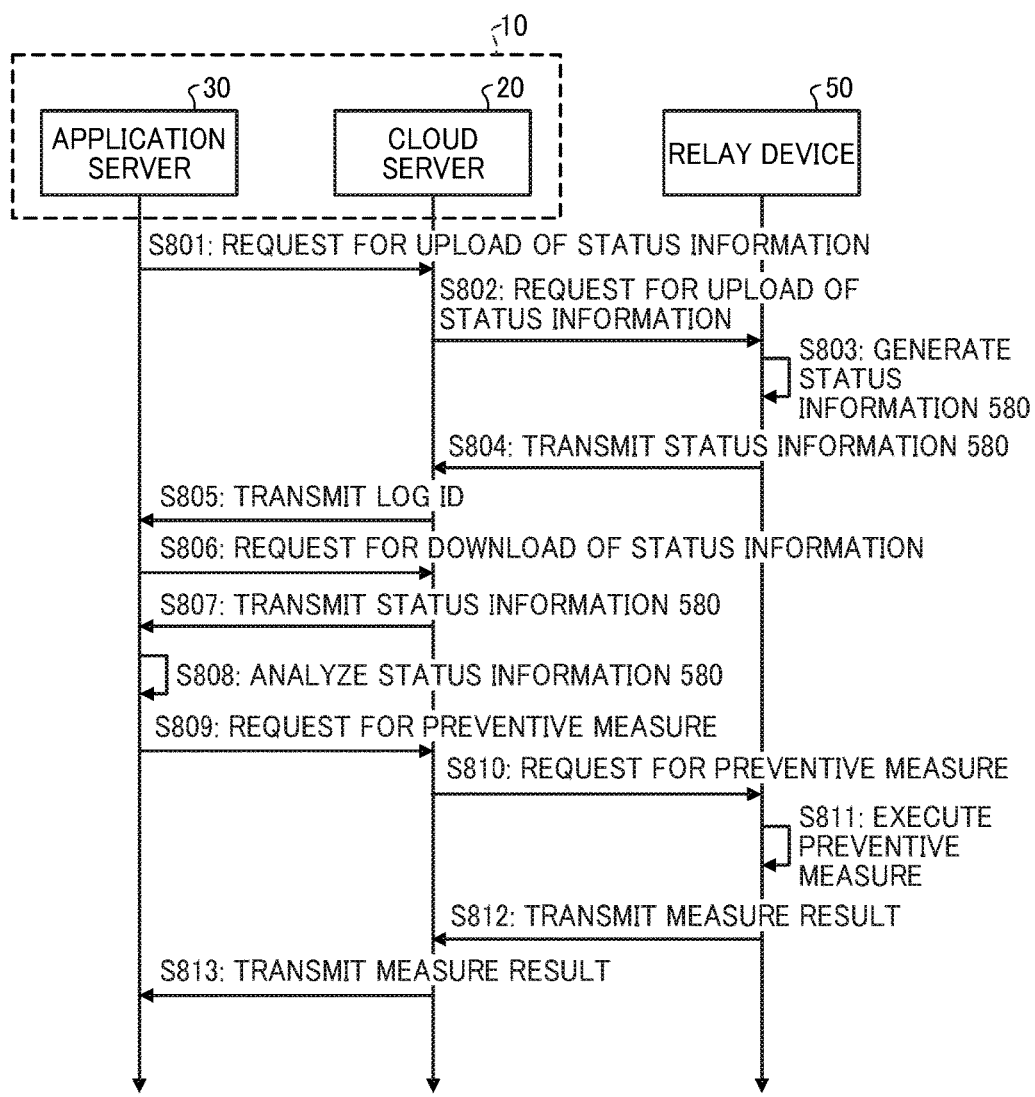
FIG. 31 is a sequence diagram illustrating one example of a device management method in a remote management system according to the fourth embodiment.

FIG. 31 is a sequence diagram illustrating one example of an device management method in a remote management system according to the fourth embodiment. In step S801, the application server 30 transmits to the cloud server 20 a request for upload of status information of the relay device 50. In step S802, the cloud server 20 transfers to the relay device 50 the request for the upload of status information transmitted from the application server 30.

In step S803, when receiving the request for the upload of status information, the relay device 50 generates the status information 580 including information on a computer resource of the relay device 50. In step S804, the relay device 50 transmits the generated status information 580 to the cloud server 20.

In step S805, when receiving the status information 580 from the relay device 50, the cloud server 20 assigns a log ID to the received status information 580 and transmits the log ID to the application server 30. In addition, the cloud server 20 stores in the status information management DB 255 the status information 580 to which the log ID is assigned.

In step S806, the application server 30 transmits to the cloud server 20 a request for download of status information. The download request includes information of the log ID transmitted from the cloud server 20. In step S807, when receiving the download request of the status information, the cloud server 20 transmits the status information 580 corresponding to the log ID from among the status information stored in the status information management DB 255.

In step S808, when receiving the status information 580 from the cloud server 20, the application server 30 analyzes the status information 580. In a process for analyzing the status information 580 in step S808, as illustrated in variation 2 of the first embodiment, the status information analyzer 302 of the application server 30 may use the measure information management table 351*b* to perform a specific process of a preventive measure for the relay device 50. The process for analyzing the status information 580 may use the measure information management table 351 to perform the specific process of the preventive measure for relay device 50 as described in the first embodiment. In this case, in a process of step S807, the alert policy manager 204 of the cloud server 20 judges necessity for an alert notification for the status information 580 for which a download request has been received and transmits to the application server 30 the alert notification of the status information 580 judged to be necessary.

In step S809, the application server 30 transmits to the cloud server 20 a request for a preventive measure based on the determined measure information. In step S810, the cloud server 20 transfers to the relay device 50 the request for the preventive measure transmitted from the application server 30. In step S811, when receiving the request for the preventive measure from the cloud server 20, the relay device 50 executes the requested preventive measure.

In step S812, when the preventive measure is terminated, the relay device 50 transmits a measure result notification to the cloud server 20 as feedback to the request for the preventive measure. In step S813, the cloud server 20 transfers to the application server 30 the measurement result notification received from the relay device 50. Processes of steps S809 to S813 are similar to those of steps S106 to S110 illustrated in FIG. 10.

While a case where the remote management system according to the present embodiment transmits a request for acquisition of the status information of the relay device 50 has been described, the remote management system may be configured to transmit request for acquisition of the device information the device 60 from the application server 30. In this case, a process for acquiring the device information and a process for detecting a sign of failure (abnormality) of the device 60 are performed with the use of the configuration described in the third embodiment.

As described above, the remote management system according to the fourth embodiment can acquire a log not only by a log up from the relay device 50 by a preset schedule control but also by the application server 30 at a time at which the application server 30 desires to acquire the log and detect a sign of failure to perform a preventive measure. Therefore, the remote management system 1*e* can flexibly perform device management for continuously and normally operating the system according to a network environment to which the relay device 50 belongs and how to operate each application 35. In addition, by acquiring a log only when there is a request from the application server 30, traffic volume accompanied with the device management can be reduced.

Other Embodiment

Figure 32:
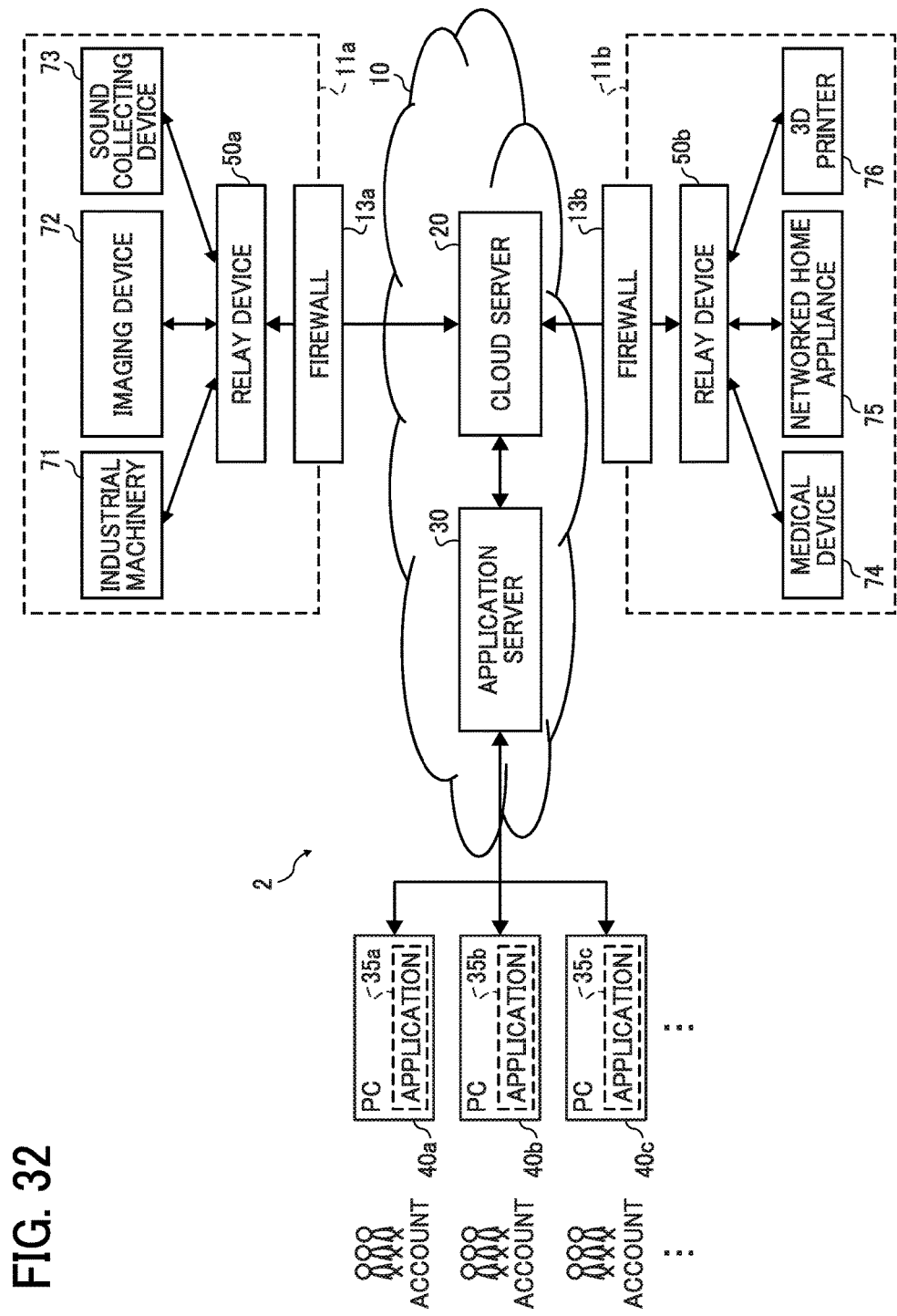
FIG. 32 is a diagram illustrating one example of a system configuration of a remote management system according to another embodiment.

FIG. 32 is a diagram illustrating one example of a system configuration of a remote management system according to another embodiment. The remote management system 2 illustrated in FIG. 32 includes a local network 11*a* and a local network 11*b*. The local network 11*a* and the local network 11*b* are networks used in different environments, and types of the managed device 60 and located in respective networks are different. The local network 11*a* and the local network 11*b* are, for example, a network formed in each customer.

The local network 11*a* includes a relay device 50*a*, an industrial machinery 71, an imaging device 72, and a sound collecting device 73. The relay device 50*a* can communicate with the industrial machinery 71, the imaging device 72, and the sound collecting device 73 via a wired or wireless LAN or the like. In addition, the relay device 50*a* can communicate with the cloud server 20 via a firewall 13*a*.

The industrial machinery 71 is a processing device, an inspection device, a conveying device, a picking device, or the like. The industrial machinery 71 transmits, device information such as identification information, an operation status, presence/absence of abnormal operation, and information on a replacement time of an expendable supply of the device, and an inspection result by device, to an device management system (the cloud server 20 or the application server 30). The industrial machinery 71 uses various information transmitting units such as a data format and an image format to transmit the device information to the device management system (the cloud server 20 or the application server 30). The imaging device 72 and the sound collecting device 73 are, for example, devices that are attached to, or attached around the industrial machinery 71 itself for grasping a status of the industrial machinery 71.

The local network 11*b* includes a relay device 50*b*, medical device 74, a networked home appliance 75, and a 3D printer 76. The relay device 50*b* can communicate with the medical device 74, the networked home appliance 75, and the 3D printer 76 via a wired or wireless LAN or the like. In addition, the relay device 50*b* can communicate with the cloud server 20 via a firewall 13*b*.

The medical device 74 is a fundus examination device, an X-ray examination device, a blood pressure monitor, a body fat meter, a visual acuity meter, a pacemaker, or the like. The medical device 74 transmits to an device management system (the cloud server 20 or the application server 30) device information such as identification information of the device, an operation status and presence/absence of abnormal operation of the device, a measurement result by the device. The medical device 74 uses various information transmitting units such as a data format and an image format to transmit the device information to the device management system (the cloud server 20 or the application server 30). The networked home appliance 75 is, among consumer electronics (home appliances), a device having a function for connecting to a network.

As a modeling method, the 3D printer 76 employs a material extrusion deposition method (FDM (Fused Deposition Modeling)), material jetting, binder jetting, powder sintering laminated molding (SLS (Selective Laser Sintering)), laser beam lithography (SLA (Stereolithography)) or the like. The 3D printer 76 uses various data formats such as numerical data, text data, and image data to transmit, the identification information of the device, the operation status and presence/absence of abnormal operation of the device, a status of an expendable supply attached to the device, and the like, to the device management system (the cloud server 20 or the application server 30) via the relay device 50*b*.

The managed device 60 in the remote management system 2 is not limited to this. The device 60 may be, for example, device obtained by providing a communication function in a vending machine, a power supply device, an air conditioning system, and a weighing system of gas, water, electricity or the like.

In the remote management system 2 illustrated in FIG. 32, the relay device 50 is connected to the device management system 10 via the firewall 13*a* or the firewall 13*b*. The relay device 50 may be provided with a firmware updating function unit that uses Internet connection to update firmware provided in the device 60. While an example of FIG. 32 illustrates a configuration including a plurality of pieces of device 60 and one relay device 50 in one local network, a plurality of relay devices 50 may be included. For example, in a case where a process load becomes large with one relay device 50, a function for updating the firmware of the device 60 and a function for intensively performing remote management of the device 60 are divided and assigned to a plurality of relay devices.

As described above, the device management system according to one embodiment of the present invention is the device management system 10 that communicates with, the relay device 50 connected to the device 60 in the local network 11, via the firewall 13, and receives the status information 580 indicating a status of the relay device 50 from the relay device 50. Then, if the received status information 580 fulfills a predetermined condition, the device management system 10 determines instruction information instructing execution of a predetermined process associated with the condition and transmits the determined instruction information to the relay device 50. Therefore, the device management system 10 detects a sign of failure (abnormality) and performs a preventive measure before occurrence of the failure (abnormality) due to the relay device 50. Thus, the system can be continuously and normally operated.

In addition, when the received status information 580 fulfills a condition that a resource status of the relay device 50 exceeds a predetermined threshold, the device management system according to one embodiment of the present invention determines instruction information instructing execution of a predetermined process associated with the condition. Therefore, the device management system 10 instructs the relay device 50 to execute a process (preventive measure) according to the resource status of the relay device 50. Thus, the system can be continuously and normally operated without causing a failure (abnormality) due to the relay device 50.

If the received status information 580 fulfills a condition that a predetermined character string indicating a resource status of the relay device 50 is included, the device management system according to one embodiment of the present invention determines instruction information instructing execution of a predetermined process associated with the condition. Therefore, the device management system 10 instructs the relay device 50 to execute a process (preventive measure) according to the resource status of the relay device 50. Thus, the system can be continuously and normally operated without causing a failure (abnormality) due to the relay device 50.

In addition, the device management system according to one embodiment of the present invention sets a time for acquiring the status information 580 from the relay device 50 for each relay device 50 and receives the status information 580 from the relay device 50 at the set time. Therefore, in the device management system 10, an appropriate system operation becomes possible according to an environment to which the system is applied and a type of a managed device.

The device management system according to one embodiment of the present invention sets the relay device 50 to transmit, information corresponding to a specific resource item, as the status information 580, and receives information indicating a status of the relay device 50 corresponding to the set resource item. Therefore, in the device management system 10, an appropriate system operation becomes possible according to an environment to which the system is applied and a type of a managed device.

In addition, the device management system according to one embodiment of the present invention receives device information indicating a status of the device 60 from the relay device 50, and if the received device information fulfills a condition (one example of a second condition) for detecting an abnormal sign of the device 60, the device management system determines instruction information instructing execution of a predetermined process associated with the condition (one example of second instruction information). Therefore, the device management system 10 can preliminarily detect a sign of failure (abnormality) of the managed device 60 and cause the device 60 to execute a preventive measure. Thus, a system can be continuously and normally operated including an internal environment of the local network 11.

The device management method according to one embodiment of the present invention is executed by the device management system 10 that communicates with, the relay device 50 connected to the device 60 in the local network 11, via the firewall 13, and executes: a receiving step for receiving the status information 580 indicating a status of the relay device 50 from the relay device 50; a determining step for determining, if the received status information 580 fulfills a predetermined condition, instruction information instructing execution of a predetermined process associated with the condition; and a transmitting step for transmitting the determined instruction information to the relay device 50. Therefore, the device management system 10 that executes the device management method according to one embodiment of the present invention detects a sign of failure (abnormality) and performs a preventive measure before occurrence of the failure (abnormality) due to the relay device 50. Thus, the system can be continuously and normally operated.

The functions of each embodiment can be achieved by a computer executable program written in a legacy programming language such as assembler, C, C++, C#, Java (Registered Trademark) or the like, and an object-oriented programming language or the like. The functions can be distributed by being stored in a device readable recording medium such as an EEPROM (Electrically Erasable Programmable Read-Only Memory), an EPROM (Erasable Programmable Read-Only Memory), a Flash memory, a Flexible Disk, a CD (Compact Disc)-ROM, a CD-RW (Re-Writable), a DVD-ROM, a DVD-RAM, a DVD-RW, a Blu-ray Disc, an SD card, and an MO (Magneto-Optical disc) or can be distributed through an electric communication line.

In addition, a part or all of the functions of each embodiment can be implemented on a programmable device (PD) such as an FPGA (Field Programmable Gate Array) or can be implemented as an ASIC (Application Specific Integrated Circuit) Circuit, and can be distributed by a recording medium as circuit configuration data (bit stream data) downloaded to the PD in order to achieve the functions of each embodiment on the PD, and as data written in HDL (Hardware Description Language) for generating the circuit configuration data, VHDL (Very High Speed Integrated Circuits Hardware Description Language), Verilog-HDL, or the like.

While the device management system, the device management method and the program according to one embodiment of the present invention have been described so far, the present invention is not limited to the abovementioned embodiment, and other embodiments, additions, modifications, deletions and the like are possible within a range that can be conceived by a person skilled in the art, and any aspect is included in the scope of the present invention as long as the aspect exhibits the function and effect of the present invention.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A device management system for communicating with a relay device connected with one or more devices in a local network via a firewall, the device management system comprising:
circuitry configured to:
receive status information indicating a status of the relay device from the relay device,
based on a determination that the received status information satisfies a predetermined condition, obtain instruction information associated with the predetermined condition, the instruction information indicating a predetermined process to be executed by the relay device, the predetermined process corresponding to a reboot process when the status information of the relay device indicates the relay device is low on memory, and
transmit the obtained instruction information to the relay device to cause the relay device to execute the predetermined process, which corresponds to the reboot process when the status information of the relay device indicates the relay device is low on memory.

2. The device management system of claim 1,
wherein the predetermined condition includes a condition that a resource status of the relay device exceeds a predetermined threshold, and
the instruction information associated with the condition that the resource status of the relay device exceeds the predetermined threshold, instructs to execute processing that causes the resource status of the relay device to be below the predetermined threshold.

3. The device management system of claim 1,
wherein the predetermined condition includes a condition that a predetermined character string indicating a resource status of the relay device is included, and
wherein the circuitry obtains the instruction information when the received status information includes the predetermined character string.

4. The device management system of claim 1,
wherein the relay device includes a plurality of relay devices respectively disposed in a plurality of local networks,
wherein the circuitry further sets, for each relay device, a time at which the status information is acquired from the relay device and receives the status information from the relay device at the set time.

5. The device management system of claim 4,
wherein the circuitry sets, for each relay device, a specific resource of the relay device as a target to acquire the status information, and receives information indicating a status of the relay device corresponding to the specific resource.

6. The device management system of claim 1, further comprising:
a first management device including first circuitry configured to communicate with the relay device via the firewall; and
a second management device including second circuitry configured to provide an application for managing the one or more devices in the local network,
the first circuitry and the second circuitry being configured to operate in cooperation as the circuitry,
wherein when the received status information satisfies the predetermined condition, the first circuitry notifies the second management device of an alert, and the second circuitry obtains the instruction information corresponding to the notified alert.

7. The device management system of claim 1,
wherein the circuitry further receives device information indicating a status of at least one device of the one or more devices from the relay device, and
when the received device information satisfies a second condition that is for detecting an abnormal sign of the at least one device, the circuitry obtains second instruction information associated with the second condition, the second instruction information indicating a predetermined process to be executed by the at least one device.

8. The device management system of claim 1, further comprising:
a memory configured to store a plurality of items of instruction information in association with a plurality of predetermined conditions, wherein the circuitry selects, from among the plurality of items of instruction information, the instruction information associated with the predetermined condition satisfied by the received status information.

9. The device management system of claim 8,
wherein the relay device includes a plurality of relay devices respectively disposed in a plurality of different local networks,
wherein the memory stores the plurality of items of instruction information in association with the plurality of predetermined conditions, for each one of the plurality of relay devices, and
wherein the circuitry selects, from among the plurality of items of instruction information stored for the relay device that has transmitted the status information, the instruction information associated with the predetermined condition satisfied by the received status information.

10. The device management system of claim 1,
wherein the predetermined condition indicates detection of an abnormal sign of the relay device, and
wherein the predetermined process prevents further detection of the abnormal sign of the relay device.

11. The device management system of claim 1, wherein the predetermined process corresponds to
the reboot process when the status information of the relay device indicates the relay device is low on memory,
a file deletion process when the status information of the relay device indicates that storage of the relay device is full,
a reset process of a peripheral device associated with the relay device when the status information of the relay device indicates an input/output error, and
a firmware update process when the status information of the relay device indicates that there is a bug in software.

12. A device management method comprising:
receiving status information indicating a status of a relay device from the relay device, the relay device being connected with one or more devices in a local network via a firewall;
determining whether the received status information satisfies a predetermined condition;
obtaining instruction information associated with the predetermined condition, the instruction information indicating a predetermined process to be executed by the relay device, the predetermined process corresponding to a reboot process when the status information of the relay device indicates the relay device is low on memory; and
transmitting the obtained instruction information to the relay device to cause the relay device to execute the predetermined process which corresponds to the reboot process when the status information of the relay device indicates the relay device is low on memory.

13. The method of claim 12,
wherein the determining includes determining whether a resource status of the relay device exceeds a predetermined threshold, and
wherein the obtained instruction information instructs to execute processing that causes the resource status of the relay device to be below the predetermined threshold.

14. The method of claim 12,
wherein the determining includes determining whether the received status information includes a predetermined character string indicating a resource status of the relay device, and
wherein the obtaining is performed when the received status information includes the predetermined character string.

15. The method of claim 12, wherein the relay device includes a plurality of relay devices respectively disposed in a plurality of local networks, the method further comprising:
setting, for each relay device, a time at which the status information is acquired from the relay device, such that the status information is received from the relay device at the set time.

16. The method of claim 15, further comprising:
setting, for each relay device, a specific resource of the relay device as a target to acquire the status information,
wherein the receiving includes receiving information indicating a status of the relay device corresponding to the specific resource.

17. The method of claim 12, further comprising:
receiving device information indicating a status of at least one device of the one or more devices from the relay device;
determining whether the received device information satisfies a second condition that is for detecting an abnormal sign of the at least one device; and
obtaining second instruction information associated with the second condition when the determining determines that the received device information satisfies the second condition, the second instruction information indicating a predetermined process to be executed by the at least one device.

18. The method of claim 12, further comprising:
storing, in a memory, a plurality of items of instruction information in association with a plurality of predetermined conditions,
wherein the obtaining includes selecting, from among the plurality of items of instruction information, the instruction information associated with the predetermined condition satisfied by the received status information.

19. A non-transitory recording medium which, when executed by one or more processors, cause the processors to perform a device management method, the method comprising:
receiving status information indicating a status of a relay device from the relay device, the relay device being connected with one or more devices in a local network via a firewall;
determining whether the received status information satisfies a predetermined condition;
obtaining instruction information associated with the predetermined condition, the instruction information indicating a predetermined process to be executed by the relay device, the predetermined process corresponding to a reboot process when the status information of the relay device indicates the relay device is low on memory; and
transmitting the obtained instruction information to the relay device to cause the relay device to execute the predetermined process, which corresponds to the reboot process when the status information of the relay device indicates the relay device is low on memory.

* * * * *